US008662232B2

(12) United States Patent
Nakamura et al.

(10) Patent No.: US 8,662,232 B2
(45) Date of Patent: Mar. 4, 2014

(54) ELECTRIC TWO-WHEELED MOTOR VEHICLE

(75) Inventors: Masanori Nakamura, Wako (JP); Ryo Sato, Wako (JP); Takasumi Yamanaka, Wako (JP); Hideaki Nakagawa, Wako (JP); Tatsuya Minagawa, Wako (JP); Tetsuro Hosoda, Wako (JP)

(73) Assignee: Honda Motors Co., Ltd., Tokyo (JP)

( * ) Notice: Subject to any disclaimer, the term of this patent is extended or adjusted under 35 U.S.C. 154(b) by 14 days.

(21) Appl. No.: 13/496,132

(22) PCT Filed: Sep. 7, 2010

(86) PCT No.: PCT/JP2010/065323
§ 371 (c)(1),
(2), (4) Date: Apr. 26, 2012

(87) PCT Pub. No.: WO2011/033967
PCT Pub. Date: Mar. 24, 2011

(65) Prior Publication Data
US 2012/0199409 A1 Aug. 9, 2012

(30) Foreign Application Priority Data

Sep. 15, 2009 (JP) ................................. 2009-213538
Sep. 15, 2009 (JP) ................................. 2009-213691

(51) Int. Cl.
*B62K 11/00* (2013.01)
*B62M 7/00* (2010.01)
(52) U.S. Cl.
USPC ....................................................... 180/220
(58) Field of Classification Search
USPC ....................................................... 180/220
See application file for complete search history.

(56) References Cited

U.S. PATENT DOCUMENTS

2004/0031632 A1* 2/2004 Kohda et al. ................. 180/68.5
2007/0089922 A1 4/2007 Iwasaki

FOREIGN PATENT DOCUMENTS

| CN | 1104157 A | 6/1995 |
| CN | 1730346 A | 2/2006 |
| CN | 1796184 A | 7/2006 |
| DE | 20014260 U1 | 1/2001 |

(Continued)

OTHER PUBLICATIONS

Japanese OA, 2009-213691, Dated Dec. 19, 2012.

(Continued)

*Primary Examiner* — Kevin Hurley
*Assistant Examiner* — Marc A Scharich
(74) *Attorney, Agent, or Firm* — Squire Sanders (US) LLP

(57) ABSTRACT

In an electric two-wheeled motor vehicle including: an electric motor for generating power to drive a rear wheel; a battery for supplying electric power to the electric motor; a rider seat on which a rider seats; a housing box disposed below the rider seat; and a side cover covering the housing box below the rider seat, the electric two-wheeled motor vehicle configured to allow charging of the battery, an opening (118) covered with an openable and closeable lid member (120) is provided in the side cover (48), and a power-receiving-side connector (67) to which a power-supplying-side connector leading to an external power source can be inserted and connected is fixed and disposed between an outer surface of the side cover (48) and the housing box to face the opening (118). Accordingly, it is possible to eliminate the requirement for a rider seat to be opened in charging of a battery and thereby facilitate the charging work.

21 Claims, 20 Drawing Sheets

(56) References Cited

FOREIGN PATENT DOCUMENTS

| | | |
|---|---|---|
| JP | 01-299554 A | 12/1989 |
| JP | 3-37771 U | 4/1991 |
| JP | 3-45001 U | 4/1991 |
| JP | 05105144 A | 4/1993 |
| JP | 05105147 A | 4/1993 |
| JP | 07-117492 A | 5/1995 |
| JP | 11-321753 A | 11/1999 |
| JP | 3336529 B2 | 8/2002 |
| JP | 2005205965 A | 8/2005 |
| JP | 2008195242 A | 8/2008 |
| JP | 2009-112076 A | 5/2009 |
| JP | 2009-202677 A | 9/2009 |
| TW | M354530 U | 4/2009 |

OTHER PUBLICATIONS

EP International Search Report for EP Application No. 10 81 7080, Mar. 11, 2013.

Japanese Office Action application No. 2009-213538 dated Dec. 12, 2012.

International Search Report corresponding to International Application No. PCT/JP2010/065323 dated Dec. 14, 2010 and English translation thereof.

* cited by examiner

ELECTRIC TWO-WHEELED MOTOR VEHICLE

TECHNICAL FIELD

The present invention relates to an electric two-wheeled motor vehicle including: an electric motor for generating power to drive a rear wheel; a battery for supplying electric power to the electric motor; a rider seat on which a rider seats; a housing box disposed below the rider seat; and a side cover covering the housing box below the rider seat, the electric two-wheeled motor vehicle configured to allow charging of the battery.

BACKGROUND ART

Among electric scooters which travel by driving a rear wheel by using a drive force generated by an electric motor, an electric scooter in which a battery for supplying electric power to the electric motor can be charged with a charger is already known from Patent Document 1.

PRIOR ART DOCUMENT

Patent Document

Patent Document 1: Japanese Patent No. 3336529

SUMMARY OF INVENTION

Problems to be Solved by the Invention

In the above-described electric scooter disclosed in Patent Document 1, the charger connected to the battery is disposed below a storage box, and a power-receiving-side connection terminal connected to the charger is provided in a front portion of the storage box. When a work of charging from an external power source is to be performed, a rider seat above the storage box needs to be opened. Thus, not only the charging work is cumbersome, but also the rider seat needs to be left open in a charging state and there is a desire for a configuration allowing the charging work to be performed with the rider seat closed.

The present invention is made in view of the circumstances described above, and an object thereof is to provide an electric two-wheeled motor vehicle which eliminates the requirement for a rider seat to be opened in charging of a battery and thereby facilitates the charging work.

Means for Solving the Problems

In order to attain the above object, according to a first aspect of the present invention, there is provided an electric two-wheeled motor vehicle including: an electric motor for generating power to drive a rear wheel; a battery for supplying electric power to the electric motor; a rider seat on which a rider seats; a housing box disposed below the rider seat; and a side cover covering the housing box below the rider seat, the electric two-wheeled motor vehicle configured to allow charging of the battery, characterized in that an opening covered with an openable and closeable lid member is provided in the side cover, a power-receiving-side connector to which a power-supplying-side connector leading to an external power source is capable of being inserted and connected is fixed and disposed between an outer surface of the side cover and an outer surface of a side wall of the housing box to face the opening, and an insertion-connection direction of the power-supplying-side connector to the power-receiving-side connector is set to be inclined inward in a vehicle width direction toward the power-receiving-side connector from front or rear of the power-receiving-side connector. Further, according to a second aspect of the present invention, there is provided an electric two-wheeled motor vehicle including: an electric motor for generating power to drive a rear wheel; a battery for supplying electric power to the electric motor; a rider seat on which a rider seats; a housing box disposed below the rider seat; and a side over covering the housing box below the rider seat, the electric two-wheeled motor vehicle configured to allow charging of the battery, characterized in that an opening covered with an openable and closeable lid member is provided in the side cover, a power-receiving-side connector to which a power-supplying-side connector leading to an external power source is capable of being inserted and connected is fixed and disposed between an outer surface of the side cover and an outer surface of a side wall of the housing box to face the opening, and a housing recess portion for housing and disposing her in at least part of the power-receiving-side connector is formed in part of the outer surface of the side wall of the housing box to be recessed inward. Further, according to a third aspect of the present invention, there is provided an electric two-wheeled motor vehicle including: an electric motor for generating power to drive a rear wheel; a battery for supplying electric power to the electric motor; a rider seat on which a rider seats; a housing box disposed below the rider seat; and a side cover covering the housing box below the rider seat, the electric two-wheeled motor vehicle configured to allow charging of the battery, characterized in that an opening covered with an openable and closeable lid member is provided in the side cover, a stay having an attachment portion is fixed to a frame member disposed on a lateral side of the housing box and forming part of a vehicle-body frame, the attachment portion extending inward from the frame member, and a power-receiving-side connector to which a power-supplying-side connector leading to an external power source is capable of being inserted and connected is disposed between an outer surface of the side cover and an outer surface of a side wall of the housing box to face the opening, and is attached to the attachment portion. Further, according to a fourth aspect of the present invention, there is provided an electric two-wheeled motor vehicle including: an electric motor for generating power to drive a rear wheel; a battery for supplying electric power to the electric motor; a rider seat on which a rider seats; a housing box disposed below the rider seat; and a side cover covering the housing box below the rider seat, the electric two-wheeled motor vehicle configured to allow charging of the battery, characterized in that an opening covered with an openable and closeable lid member is provided in the side cover, a power-receiving-side connector to which a power-supplying-side connector leading to an external power source is capable of being inserted and connected is fixed and disposed between en outer surface of the side cover and an outer surface of a side will of the housing box face the opening, the lid member is turnably supported by the side cover via a hinge mechanism, and a closed state maintaining mechanism is provided between the lid member and the side cover, the closed state maintaining mechanism switching between a lock state where the lid member is maintained at a closed position in a non-operation state of an operator disposed to face a surface of the side cover at a position near the opening and an unlock state where an opening operation of the lid member is allowed in accordance with an operation of the operator.

Furthermore, according to a fifth aspect of the present invention, in addition to the configuration of any one of the second to fourth aspects, an insertion-connection direction of the power-supplying-side connector to the power-receiving-side connector is set to be inclined inward in a vehicle width direction toward the power-receiving-side connector from front or rear of the power-receiving-side connector.

According to a sixth aspect of the present invention, in addition to the configuration of the first or fifth aspect, there is provided the electric two-wheeled motor vehicle further comprising a main stand configured to turn forward from a housed position to a standing position, wherein the insertion-connection direction of the power-supplying-side connector insertable and connectable to the power-receiving-side connector from the front is set to be inclined inward in the vehicle width direction toward the power-receiving-side connector from the front.

According to a seventh aspect of the present invention, in addition to any one of the configurations of the first to third, fifth and sixth aspects, the lid member is supported by the side cover such that the lid member is set to an open position by being operated rearward in a front-rear direction of a vehicle, and a turning axis of the lid member is set to be inclined upward toward the rear.

According to an eighth aspect of the present invention, in addition to any one of the configurations of the first to seventh aspects, a recess portion recessed inward from an outer side surface of the side cover is formed in the side cover to be closable by the lid member, and the opening is provided in the recess portion.

According to a ninth aspect of the present invention, in addition to any one of the configurations of the first and third to eighth aspects, a housing recess portion for housing and disposing therein at least part of the power-receiving-side connector is formed in part of the outer surface of the side wall of the housing box to be recessed inward.

According to a tenth aspect of the present invention, in addition to any one of the configurations of the first, second and fourth to ninth aspects, a stay having an attachment portion is fixed to a frame member disposed on a lateral side of the housing box and forming part of a vehicle-body frame, the attachment portion extending inward from the frame member, and the power-receiving-side connector is attached to the attachment portion.

According to an eleventh aspect of the present invention, in addition to any one of the configurations of the first to tenth aspects, there is provided the electric two-wheeled motor vehicle further comprising a side stand for maintaining a standing state in which a vehicle body is inclined to one side in a vehicle width direction, wherein the power-receiving-side connector and the opening are disposed on a lateral side of the housing box on a side in the vehicle width direction where the side stand is disposed.

According to a twelfth aspect of the present invention, in addition to any one of the configurations of the first to eleventh aspects, the power-receiving-side connector to which the power-supplying-side connector leading to the external power source via a charger is connectable is connected to the battery via a DC-DC converter disposed rearward of the housing box.

According to a thirteenth aspect of the present invention, in addition to any one of the configurations of the first to third aspects, the lid member capable of covering the opening is turnably supported by the side cover via a hinge mechanism, and a closed state maintaining mechanism is provided between the lid member and the side cover, the closed state maintaining mechanism switching between a lock state where the lid member is maintained at a closed position in a non-operation state of an operator disposed to face a surface of the side cover at a position near the opening and an unlock state where an opening operation of the lid member is allowed in accordance with an operation of the operator.

According to a fourteenth aspect of the present invention, in addition to the configuration of the fourth or thirteenth aspect, the lid member is formed to have a substantially triangular shape having three vertex portions, the closed state maintaining mechanism is provided between the lid member and the side cover, in a certain vertex portion among the vertex portions, and the lid member is turnably supported by the side cover via the hinge mechanism on a side portion of the side cover on the opposite side to the certain vertex portion.

According to a fifteenth aspect of the present invention, in addition to the configuration of the fourteenth aspect, the lid member is turnably supported by the side cover such that the lid member is in a posture with one vertex portion among the vertex portions being directed downward in a state where the opening is closed.

According to a sixteenth aspect of the present invention, in addition to any one of the configurations of the fourth and thirteenth to fifteenth aspects, a conductive wire leading to the power-supplying-side connector is interposed between the lid member in a closed state and the side cover with an elastic member interposed between the conductive wire and at least one of the lid member and the side cover.

According to a seventeenth aspect of the present invention, in addition to any one of the configurations of the fourth and thirteenth to sixteenth aspects, there is provided the electric two-wheeled motor vehicle further comprising restriction means for restricting a switching work of the operator of switching the closed state maintaining mechanism from the lock state to the unlock state.

According to an eighteenth aspect of the present invention, in addition to the configuration of the seventeenth aspect, the restriction means includes a switch operator used for switching between a restricted state where the telling of the closed state maintaining mechanism from the lock state to the unlock state is restricted and a non-restricted state where the switching of the closed state maintaining mechanism from rain the lock state to the unlock state is allowed, and the switch operator is disposed in the housing box to be capable of being operated in the housing box.

According to a nineteenth aspect of the present invention, in addition to the configuration of the eighteenth aspect, a portion of the restriction means other than the switch operator is disposed between the housing box and the side cover.

According to a twentieth aspect of the present invention, in addition to the configuration of the eighteenth or nineteenth aspect, the restriction means is configured to mechanically work in accordance with a work of the switch operator being a control knob capable of a turn operation.

Furthermore, according to an 21st aspect of the present invention, in addition to any one of the configurations of the fourth and thirteenth to twentieth aspects, a design mark showing that the power-receiving-side connector is disposed inside the lid member is provided on an external design surface of the lid member.

Here, a rear frame 29 of embodiments corresponds to the frame member of the present invention; a high voltage battery 36 of the embodiments corresponds to the battery of the present invention; a hinge mechanism 107 of the embodiments corresponds to the hinge mechanism of the present invention; an opening 118, 145 of the embodiments correspond to the opening of the present invention; a recess portion 119 of the embodiments corresponds to the recess portion of the present invention; a lid member 120, 146 of the embodiments corresponds to the lid member of the present invention; a push button 152 of the embodiments corresponds to the operator of the present invention; and a control knob 161 of the embodiments corresponds to the switch operator of the present invention.

Effects of the Invention

In accordance with the first to fourth aspects of the present invention, the power-receiving-side connector to which the power-supplying-side connector leading to the external power source is capable of being inserted and connected is fixed and disposed between the outer surface of the side cover and the outer surface of the side wall of the housing box to face the opening provided in the side cover. Thus, opening and closing works of the rider seat covering the housing box from above are not required, and at charging work can be performed with the rider seat closed. Hence, the charging work is made easy, and the usability is improved.

In accordance with the first or fifth aspect of the present invention, the insertion-connection direction of the power-supplying-side connector to the power-receiving-side connector is a direction inclined inward in the vehicle width direction toward the power-receiving-side connector from the front or the rear of the vehicle. Thus, even when the power-receiving-side connector is disposed between the side cover and the housing box, the housing box is secured to have a sufficient capacity.

In accordance with the sixth aspect of the present invention, a force applied to a hinged support of the main stand during the insertion and the connection of the power-supplying-side connector to the power-receiving-side connector is applied in such a direction that the main stand is maintained at a standing position side. Hence, the main stand does not turn undesirably to a housing position side by the insertion and connection of the power-supplying-side connector to the power-receiving-side connector.

In accordance with the seventh aspect of the present invention, the lid member is set to an opened position by being operated rearward about the turning axis inclined upward toward the rear, and the lid member is in a posture inclined downward toward the rear in the opened state. Thus, when the charging is performed with the lid member opened, turning of the lid member to a closing side which is caused by an effect of wind and the like can be avoided as much as possible.

In accordance with the eighth aspect of the present invention, the opening which the power-receiving-side connector faces is provided in the recess portion which is formed in the side cover and which can be closed with the lid member. Thus, as portion where the recess portion is formed functions as a reinforcement rib, and the strength of the side cover can be thereby improved. Furthermore, a portion inward of the side cover is covered with the recess portion except for the opening. Thus, the power-receiving-side connector can be easily found, and also it is less likely to drop small objects into the portion inward of the side cover when the recess portion is opened.

In accordance with the second or ninth aspect of the present invention, at least part of the power-receiving-side connector is housed and disposed in the housing recess portion formed in part of the outer surface of the side wall of the housing box. Thus, only a required portion of the side wall of the housing box is recessed, and the reduction of capacity of the housing box which is caused by disposing the power-receiving-side connector between the side cover and the housing box is suppressed to a small degree.

In accordance with the third or tenth aspect of the present invention, the attachment portion extending inward from the frame member is provided in the stay fixed to the frame member disposed on the lateral side of the housing box, and the power-receiving-side connector is attached to the attachment portion. Thus, the side cover can be easily attached to the frame member without the power-receiving-side connector protruding outward from the frame member.

In accordance with the eleventh aspect of the present in the power-receiving-side connector and the opening are disposed on the lateral side of the housing box on the side where the side stand is disposed, the side stand used to maintain the standing state in which the vehicle body is inclined to one side in the vehicle width direction. This improves workability of charging in a parked state with the side stand standing.

In accordance with the twelfth aspect of the present invention, the power-receiving-side connector to which the power-receiving-side connector leading to the external power source via the charger is connectable is connected to the battery via the DC-DC converter disposed rearward of the housing box. Thus, a reverse flow from the battery to the power-receiving-side connector is less likely to occur.

In accordance with the fourth or thirteenth aspect of the present invention, the closed state maintaining mechanism capable of maintaining the lid member covering the opening at the closed position is switched from the lock state where the lid member is maintained at the closed position to the unlock state where the opening operation of the lid member is allowed, in accordance with the operation of the operator disposed to face the surface of the side cover at the position near the opening. Thus, the disposed position of the operator can be found quickly, and the lid member can be opened to perform the charging work by simply operating the operator. Hence, the charging work can be made simple. Particularly, setting the operator to the unlock state allows the lid member to be readily opened at any time, and the charging can be quickly performed. Moreover, setting the operator to the lock state as needed makes it impossible for a third party to open the lid member. Thus, the state can be selected in accordance with the usage.

In accordance with the fourteenth aspect of the present invention, the closed state maintaining mechanism is provided between the lid member and the side cover, in a certain vertex portion among the three vertex portions of the lid member formed to have the substantially triangular shape, and the lid member is turnably supported by the side cover via the hinge mechanism on the side portion of the side cover on the opposite side to the certain vertex portion. Thus, a gap between the lid member and the side cover which is made by an external force can be made small, and this achieves a tamper-proof function.

In accordance with the fifteenth aspect of the present invention, the lid member having the substantially triangular shape is in such a posture that one vertex portion is directed downward in a state where the opening is closed. Thus, rain water and the like attached to the lid member can be collected to the vertex portion side at a low position and removed.

In accordance with the sixteenth aspect of the present invention, the conductive wire leading to the power-supplying-side connector is interposed between the lid member in the closed state and the side cover with an elastic member interposed between the conductive wire and at least one of the lid member and the side cover. Thus, the charging can be performed with the lid member closed.

In accordance with the seventeenth aspect of the present invention, the switching work of switching the closed state maintaining mechanism from the lock state to the unlock state is restricted by using the restriction means. This is effective when it is desired to restrict the switching work of the operator of switching the closed state maintaining mechanism from the lock state to the unlock state.

In accordance with the eighteenth aspect of the present invention, the switch operator forming part of the restriction means is capable of being operated in the housing box. Thus, the closed state maintaining mechanism can be utilized in a manner suiting the usage of the rider.

In accordance with the nineteenth aspect of the present invention, a portion of the restriction member other than the switch operator is disposed between the housing box and the side cover. Thus, the restriction means is made more compact, and a charging port structure including the restriction means and the closed state maintaining mechanism can be thereby made More compact.

In accordance with the twelfth aspect of the present invention, the switch operator is the control knob, and the restriction means is mechanically configured. Thus, increase in cost is suppressed and a power source causing the restriction means to work is not required.

In accordance with the 21st aspect of the present invention, the design mark showing that the power-receiving-side connector is disposed inside the lid member is provided on the external design surface of the lid member. This allows the position where the power-receiving-side connector is disposed to be found quickly when the charging work is to be performed, and leads to improvement in the efficiency of the charging work.

EXPLANATION OF REFERENCE NUMERALS AND SYMBOLS

Figure 1:
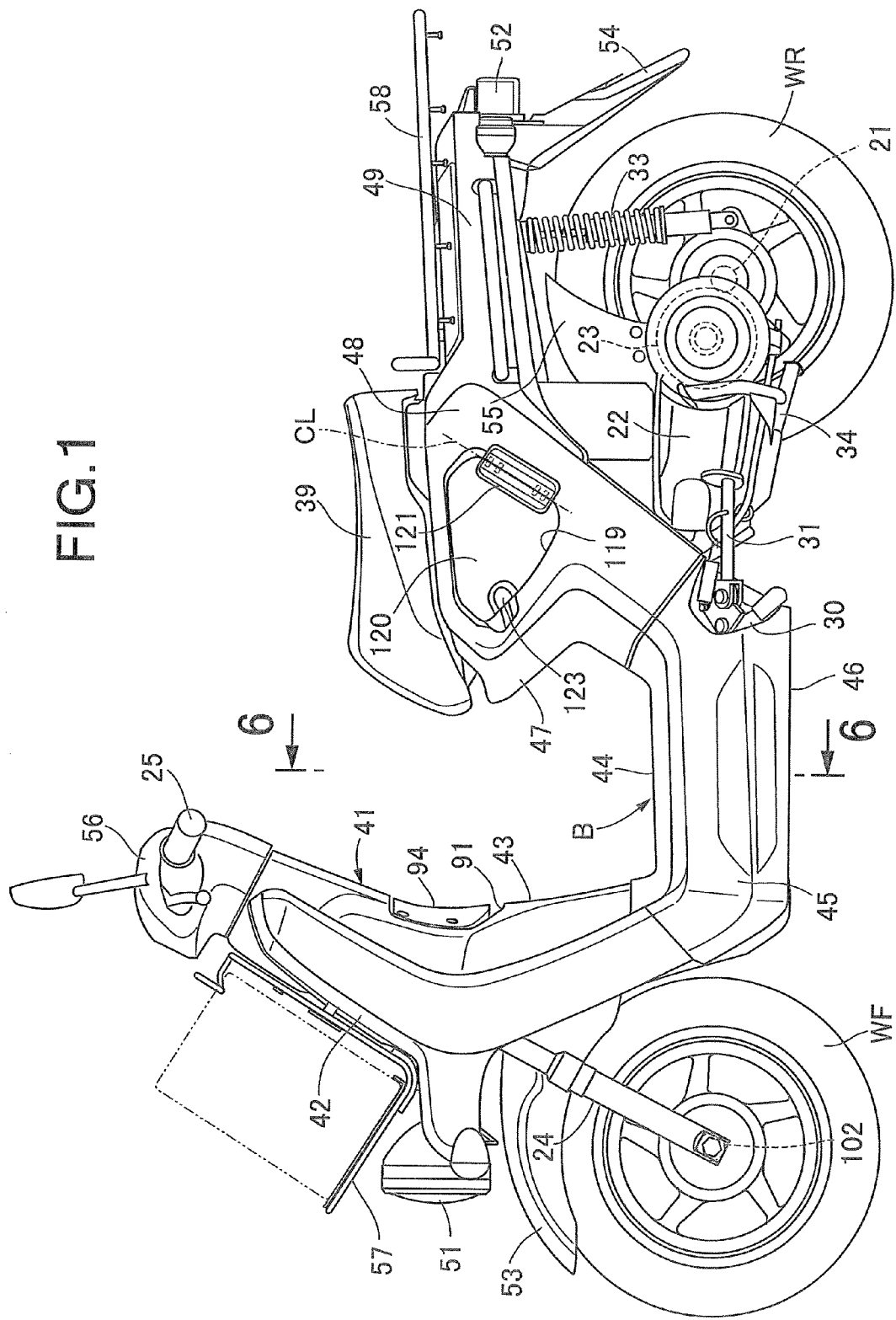
FIG. 1 is a side view of an electric two-wheeled motor vehicle according to a first embodiment. (first embodiment)

23 . . . Electric motor
29 . . . Rear frame being a frame member
31 . . . Side stand
34 . . . Main stand
36 . . . High voltage battery being a battery
38 . . . Housing box
38b . . . Housing recess portion
39 . . . Rider seat
48 . . . Side cover
65 . . . Charger
66 . . . Power-supplying-side connector
67 . . . Power-receiving-side connector
68 . . . DC-DC converter
116 . . . Stay
116a . . . Attachment portion
117 . . . Insertion-connection direction
118, 145 . . . Opening
119 . . . Recess portion
120, 146 . . . Lid member
122 . . . Conducting wire
147 . . . Hinge mechanism
150 . . . Design mark
151 . . . Closed state maintaining mechanism
152 . . . Push button being an operator
160 . . . Restriction means
161 . . . Control knob being a switch operator
167 . . . Elastic member
B . . . Vehicle body
P1, P2, P3 . . . Vertex portion
PS . . . External power source
WR . . . Rear Wheel

MODES FOR CARRYING OUT THE INVENTION

Embodiments of the present invention are explained below by reference to the attached drawings.

First Embodiment

A first embodiment of the present invention will be explained below by reference to FIG. 1 to FIG. 14. At first, in FIG. 1, this electric two-wheeled motor vehicle is a scooter type electric motorcycle having a low floor 44, and is configured such that a rear wheel WR being a drive wheel is rotationally driven by rotational power generated by an electric motor 23 built into a swingarm 22 whose rear potion pivotally supports an axle 21 of the rear wheel WR.

Figure 2:
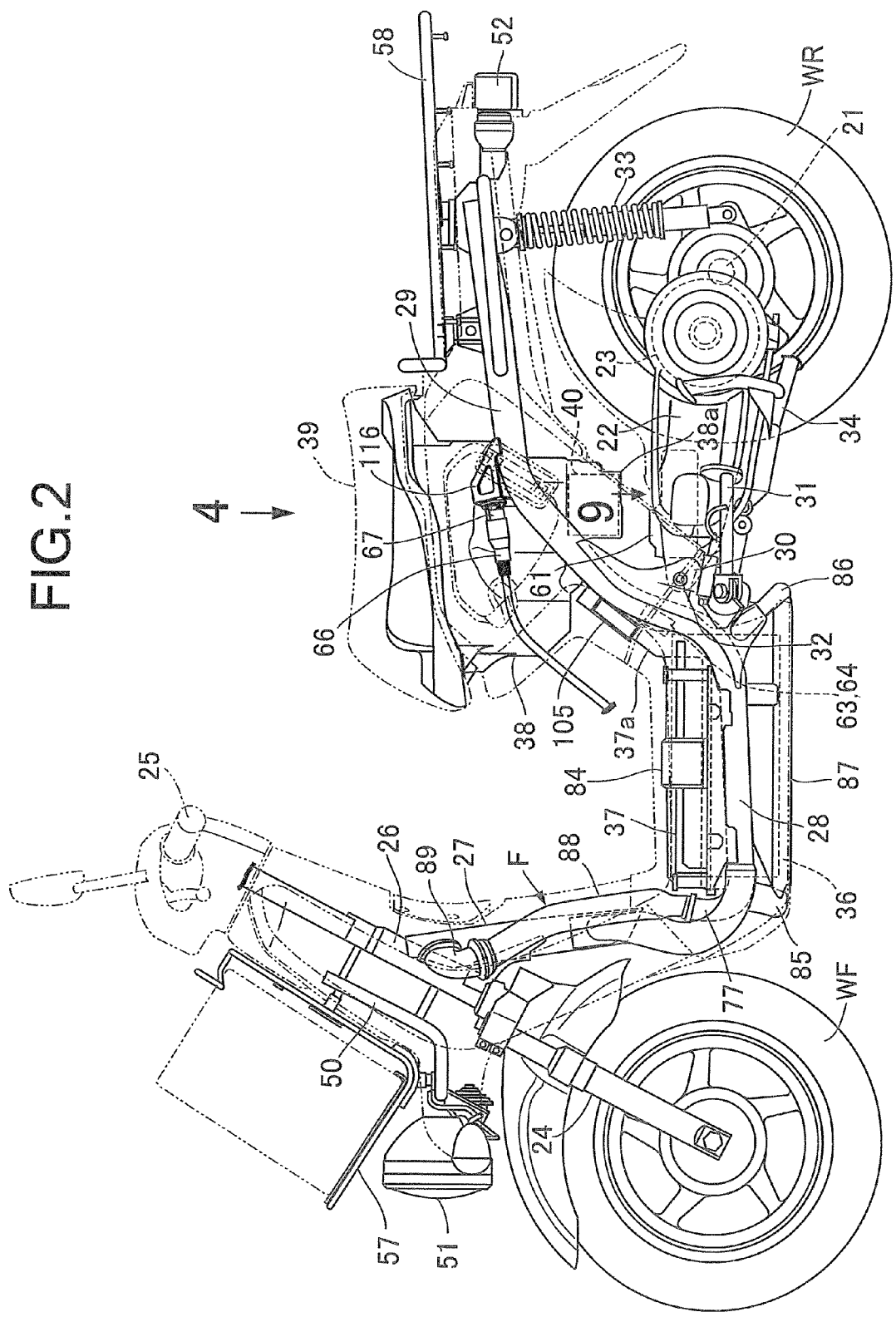
FIG. 2 is a side view of the electric two-wheeled motor vehicle with a vehicle body cover being omitted. (first embodiment)

Referring to FIG. 2, a vehicle-body frame F of the electric two-wheeled motor vehicle includes a head pipe 26 which steerably supports a front fork 24 pivotally supporting a front wheel WF and a steering handle 25 connected to an upper portion of the front fork 24, a down frame 27 which extends downward toward the rear from the head pipe 26, a pair of right and left under frames 28 . . . which are connected to a lower portion of the down frame 27 and extend rearward, and a pair of right and left rear frames 29 . . . which are integrally continuous respectively to rear ends of the under frames 28 . . . and extend upward toward the rear.

A side stand 31 for maintaining a standing state in which a vehicle body B is inclined to the left is turnably attached to pivot plates 30 provided respectively in front portions of both of the rear frames 29 . . . of the vehicle-body frame F. In addition, a front portion of the swingarm 22 is swingably supported by the pivot plates 30 via a pivot 32. A rear cushion unit 33 is provided between a rear portion of the left rear frame 29 among both of the rear frames 29 . . . and a rear portion of the swingarm 22. Moreover, a main stand 34 is turnably attached to the front portion of the swingarm 22.

A battery case 37 housing a high voltage battery 36 of, for example, 72 V for supplying electric power to the electric motor 23 is disposed between both of the under frames 28 . . . while being supported by both of the under frames 28 . . . . A housing box 38 disposed above the swingarm 22 in a side view is disposed between both of the rear frames 29 . . . while being supported by both of the rear frames 29 . . . . The housing box 38 is covered with a closeable and openable rider seat 39 from above. Moreover, a battery housing portion 38a that houses a low voltage battery 40 for supplying electric power of low voltage, for example, 12 V to accessories such as a head lamp 51, a tail lamp 52, and a control unit (not illustrated) is formed integral with a rear lower portion of the housing box 38 in such a way as to protrude downward.

The vehicle-body frame F is covered with a vehicle body cover 41 which forms the vehicle body B together with the vehicle-body frame F and is made of a synthetic resin. The vehicle body cover 41 includes a front cover 42 which covers the head pipe 26 from the front, a leg shield 43 which is continuous to the front cover 42 in such a way as to cover the leg portions of the rider sitting on the rider seat 39 from the front, the low floor 44 which is continuous to a lower portion of the leg shield 43 in such a way that the feet of the rider sitting on the ride seat 39 are placed thereon and which covers the battery case 37 from above, a pair of right and left floor side covers 45 . . . suspended from both lateral sides of the low floor 44 in such a way as to cover both of the under frames 28 . . . from both lateral sides, an under cover 46 which connects lower edges of both of the floor side covers 45 . . . , an under-seat-portion front cover 47 which extends upward from an rear end of the low floor 44 in such way as to cover a portion under the rider seat 39 from the front, a pair of right and left side covers 48 . . . which are continuous respectively to both lateral sides of the under-seat-portion front cover 47 in such a way as to cover the portion under the rider seat 39 from both lateral sides, and a rear cover 49 which is continuous to both of the side covers 48 . . . in such a way as to cover the rear wheel WR from above. The battery case 37 is covered with the low floor 44, the floor side covers 45 . . . , the under cover 46, the under-seat-portion front cover 47, and the side covers 48 . . . of the vehicle body cover 41.

The head lamp 51 is disposed at a front end of the front cover 42 while being supported by a front stay 50 fixed to the head pipe 26, and the tail lamp 52 is attached to the rear frames 29 . . . . Moreover, a front fender 53 covering the front wheel WF from above is attached to the front fork 24. A rear fender 54 covering the rear wheel WR from above in a rear oblique direction is provided continuous with the rear cover 49, and a fender 55 covering the rear wheel WR from above in a front oblique direction is attached to the front portion of the swingarm 22. Moreover, a center portion of the steering handle 25 is covered with a handle cover 56, a front carrier 57 disposed frontward of the front cover 42 is supported by the front stay 50. A rear carrier 58 is disposed rearward of the rider seat 39 above the rear cover 49 while being supported by the rear frames 29 . . . .

Figure 3:
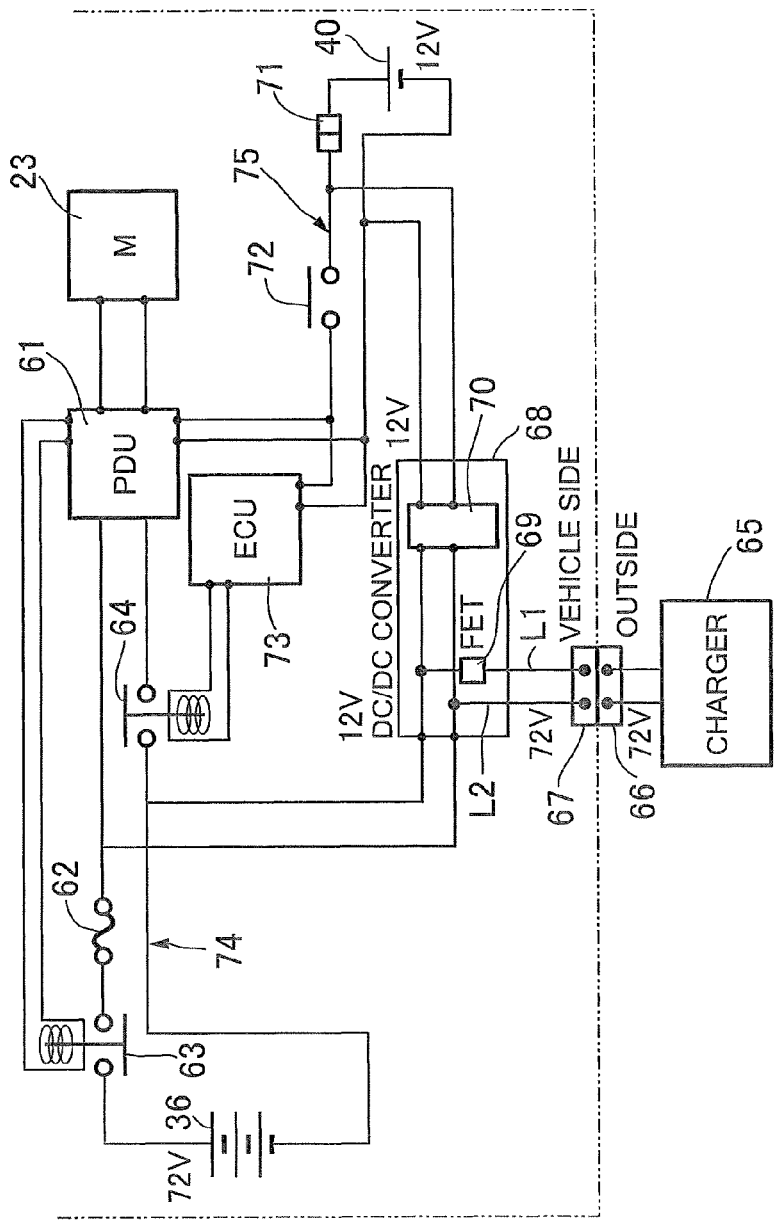
FIG. 3 is a schematic system diagram of an electric system. (first embodiment)

Referring to FIG. 3, the electric motor 23 is driven by a power drive unit (PDU) 61 including a control unit. The power drive unit 61 is connected to a positive terminal of the high voltage battery 36 via a fuse 62 and a first relay switch 63. A series circuit including a second relay switch 64 and a resistance 76 is connected in parallel to the first relay switch 63. Incidentally, the high voltage battery 36 and the low voltage battery 40 can be charged with a charger 65 which is capable of outputting a high voltage by being connected to an external power source PS, the high voltage being at the same level as that of high voltage battery 36. A power-receiving-side connector 67 to which a power-supplying-side connector 66 leading to the charger 65 connected to the external power source PS can be inserted and connected is provided on the vehicle side. The power-receiving-side connector 67 is connected to a DC-DC converter 68.

The DC-DC converter 68 includes a field effect transistor 69 which is provided in a line L1 of a pair of lines L1, L2 leading to the power-receiving-side connector 67 and a voltage drop circuit part 70 which is connected to both of the lines L1, L2 to drop the voltage from the charger 65 to a low voltage of, for example, 12 V. Both of the lines L1, L2 of the DC-DC converter 68 are connected to the positive terminal of the high voltage battery 36 via a parallel circuit of the first relay switch 63 and the series circuit including the second relay switch 64 and the resistance 76 to supply a charge current of the high voltage to the high voltage battery 36, and are also connected to a negative side terminal of the high voltage battery 36. The voltage drop circuit part 70 is connected to a positive terminal and a negative terminal of the low voltage battery 40.

The control unit included in the power drive unit 61 is connected to the positive terminal of the low voltage battery 40 via a main switch 72, and is also connected to the negative terminal of the low voltage battery 40. Moreover, switching between connection and disconnection of each of the first and second relay switches 63, 64 can be performed by use of a control current outputted from a battery managing unit (BMU) 73 by using electric power supplied from the low voltage battery 40. The battery managing unit 73 is connected to the positive terminal of the low voltage battery 40 via the main switch 72 and a connector 71, and is also connected to the negative terminal of the low voltage battery 40.

When the main switch 72 is turned ON, the battery managing unit 73 first sets the second relay switch 64 to a conductive state to cause an electric current to flow from the high voltage battery 36 to the power drive unit 61 via the second relay switch 64, the resistance 76, and the fuse 62, and thereafter causes the first relay switch 63 to be conductive. This prevents melting and adhering of the first relay switch 63 which are caused by an inrush current to a capacitor provided in the power drive unit 61.

Incidentally, a circuit between the high voltage battery 36 and the power drive unit 61 as well as a circuit between the high voltage battery 36 and the DC-DC converter 68 form a circuit (circuit shown in bold solid lines) 74 of a high power system leading to the high voltage 36. A circuit between the low voltage battery 40 and the power drive unit 61, a circuit between the low voltage battery 40 and the battery managing unit 73, and a circuit between the low voltage battery 40 and the DC-DC converter 68 form a circuit (circuit shown in thin solid lines) 75 of a low power system leading to the low voltage battery 40. The first relay switch 63, the second relay switch 64, the fuse 62 and the resistance 76 are provided in the circuit 74 of the high power system. The connector 71 and the main switch 72 are provided in the circuit 75 of the low power system.

Note that, the first relay switch 63, the second relay switch 64, and the battery managing unit 73 are housed in the battery case 37 housing the high voltage battery 36.

Figure 4:
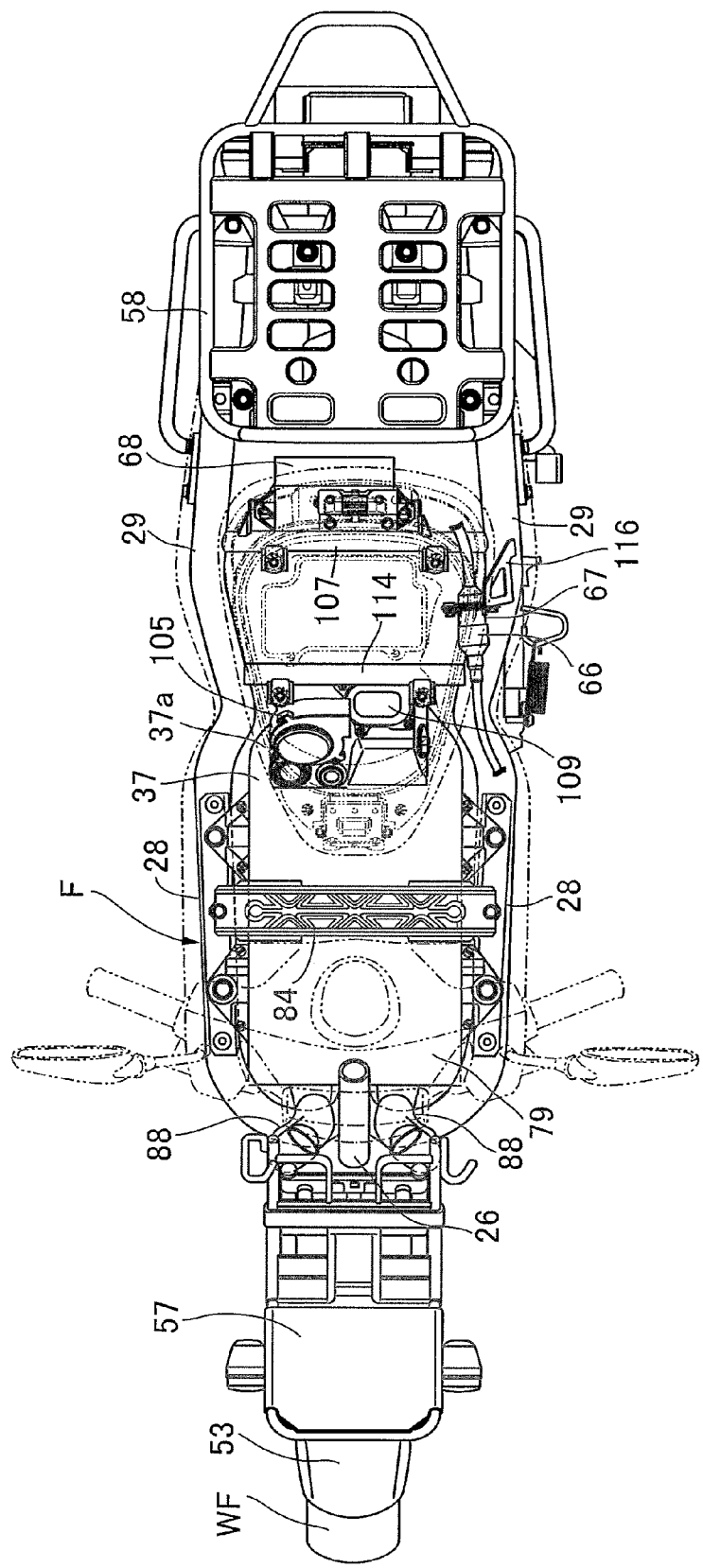
FIG. 4 is a view seen from an arrow 4 in FIG. 2. (first embodiment)
Figure 5:
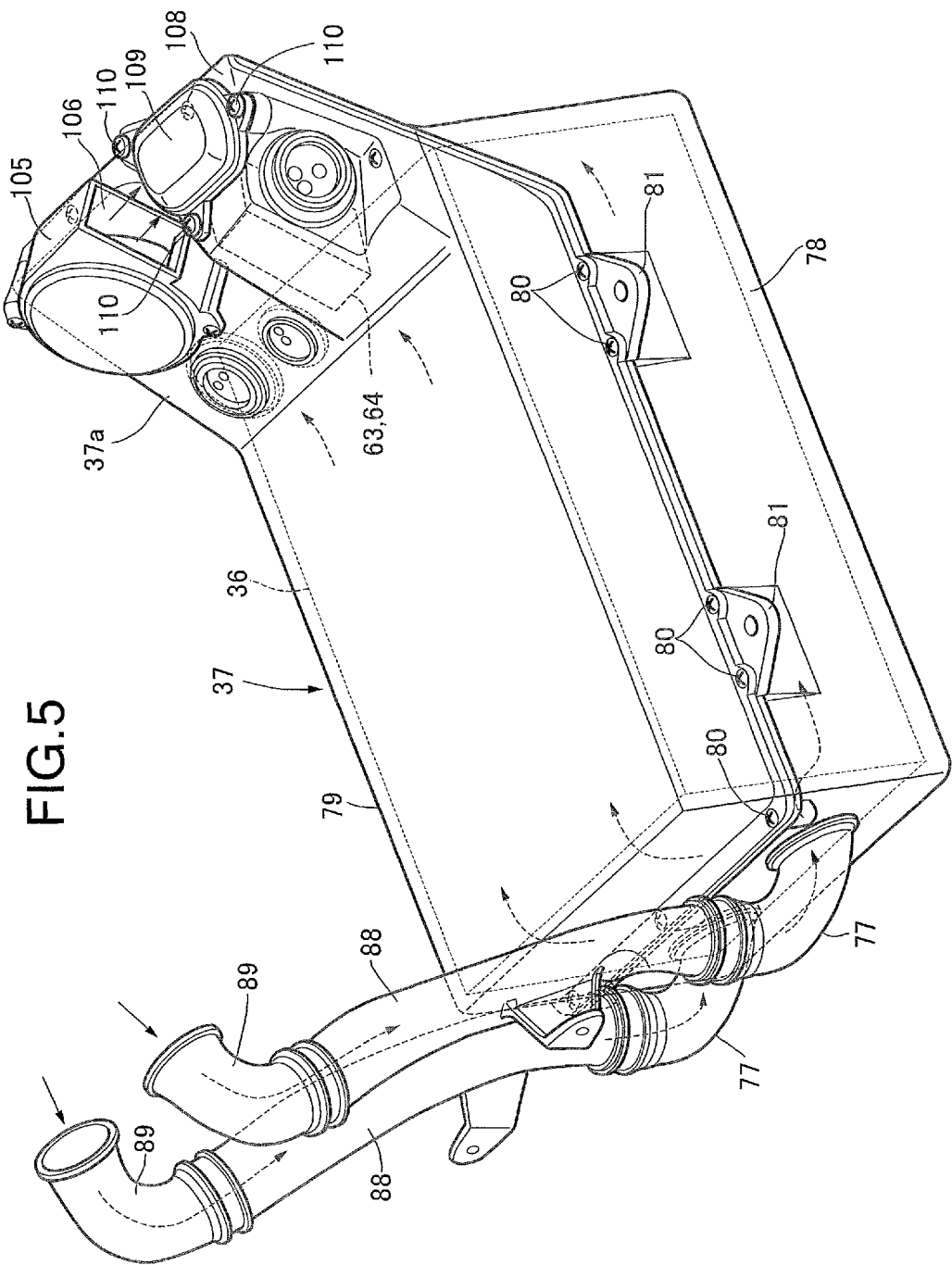
FIG. 5 is a perspective view of a battery box and cooling air introduction ducts. (first embodiment)
Figure 6:
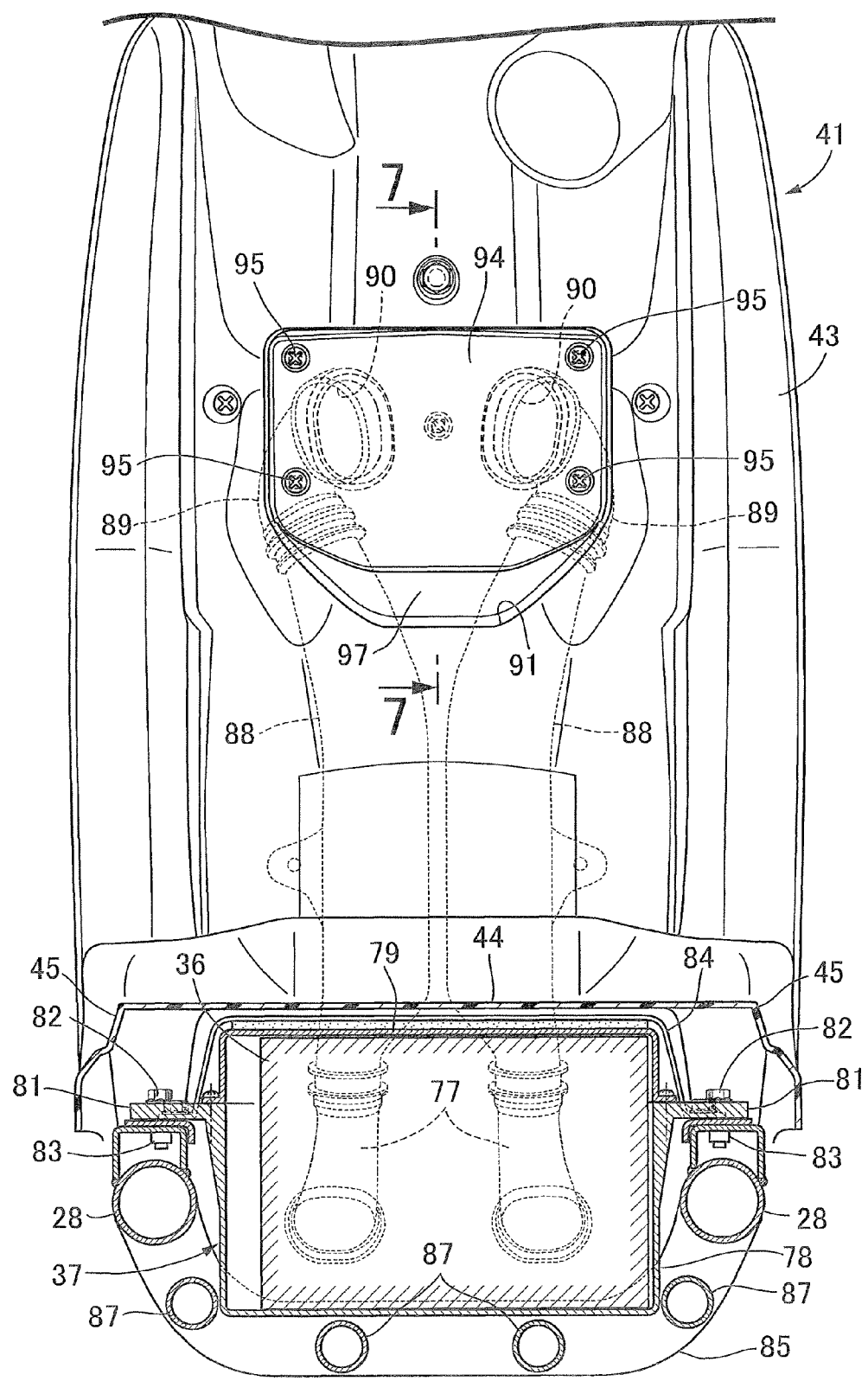
FIG. 6 is a sectional view taken along a line 6-6 in FIG. 1 with an under cover being omitted. (first embodiment)

Referring also to FIGS. 4 to 6, the battery case 37 is formed by fastening a lower case 78 having a box shape with an open top and an upper case 79 having a box shape with an open bottom to each other with multiple screw members 80, 80 . . . . Multiple support plates 81, 81 . . . protruding sideward and fixedly provided to upper portions of lateral sides of the lower case 78 are fastened to both of the under frames 28 . . . of the vehicle-body frame F by using bolts 82, 82 . . . and weld nuts 83, 83 . . . welded to the under frames 28 . . . . Thus, the battery case 37 is supported by both of the under frames 28 . . . .

A cross member 84 straddling a substantially center portion of the battery case 37 in a front-rear direction is provided between both of the under frames 28 . . . , and the low floor 44 is supported by the cross member 84. Moreover, a front protection member 85 protecting a front lower portion of the battery case 37 from the front is provided between the front portions of both of the under frames 28 . . . in such a way as to connect a center portion of the front protection member 85 to lower ends of the down frame 27. A rear portion protection member 86 protecting a rear lower portion of the battery case 37 from the rear is provided between rear portions of both of the under frames 28 . . . . Multiple lower protection members 87, 87 . . . extending in the front-rear direction are provided between the front and rear protection members 85, 86 to protect the battery case 37 from below.

Figure 7:
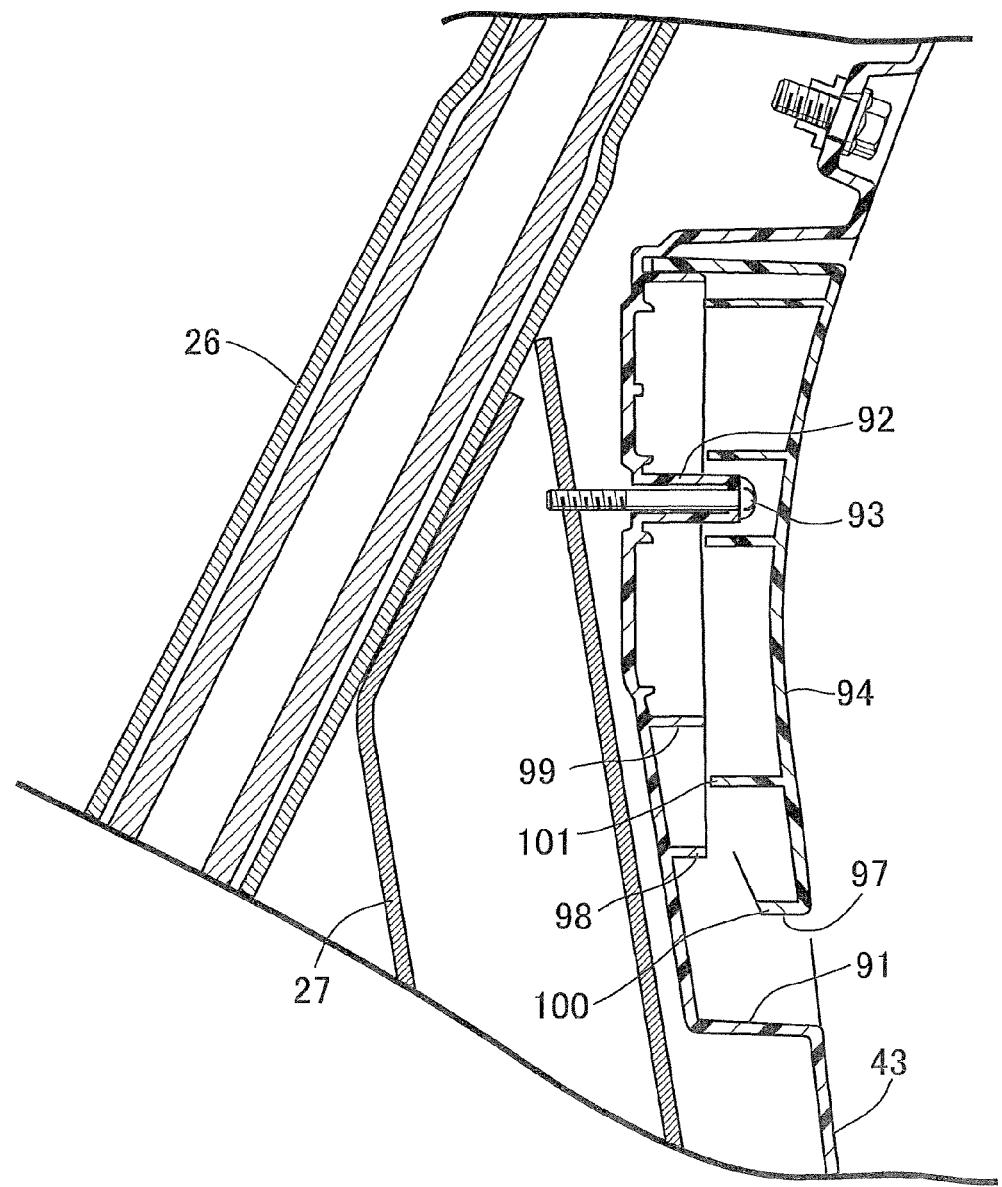
FIG. 7 is an enlarged sectional view taken along a line 7-7 in FIG. 6. (first embodiment)
Figure 8:
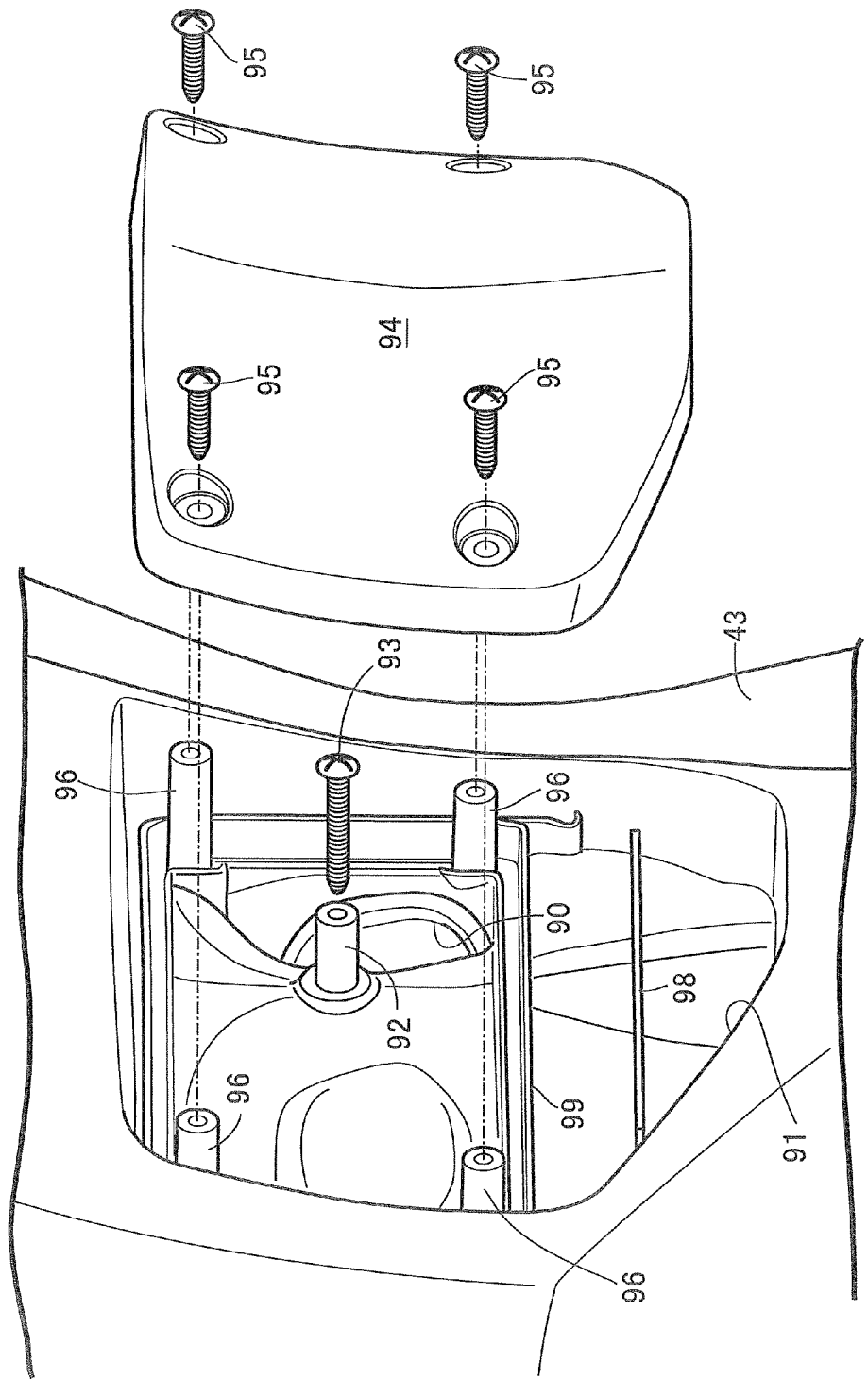
FIG. 8 is an exploded perspective view of a lea shield and a lid. (first embodiment)

Referring also to FIGS. 7 and 8, downstream end portions of a pair of right and left cooling air introduction ducts 88 . . . are connected to a front portion of the lower case 78 of the battery case 37 via connection tubes 77 . . . . Incidentally, the leg shield 43 is supported by being fixed to a stay 103 with a bolt 93, the stay 103 fixedly attached to a rear portion of the head pipe 26. Both of the cooling air introduction ducts 88 . . . having the down frame 27 interposed therebetween from both sides in the leg shield 43 are disposed to extend along the down frame 27. Meanwhile, a pair of right and left suction openings 90, 90 opened toward the rear of the vehicle are provided in the leg shield 43 at positions corresponding to the connection portion of the down frame 27 to the head pipe 26. Upstream end portions of both of the cooling air introduction ducts 88 . . . are connected to the leg shield 43 via connection tubes 89 . . . to communicate with the suction openings 90 . . . , respectively.

Incidentally, a recess portion 91 recessed frontward from a back surface of the leg shield 43 is formed in the leg shield 43, and both of the suction openings 90 . . . are provided in an upper portion of the recess portion 91. Moreover, a first boss 92 is provided integral to the recess portion 91 in a center portion between both of the suction openings 90 . . . in such a way as to protrude rearward.

A lid 94 covering both of the suction openings 90 . . . is attached to the leg shield 43 with multiple screw members 95, 95 . . . . Cylindrical second bosses 96, 96 . . . are provided, in a protruding manner, integral to the recess portion 91 at positions corresponding to respective corners of an imaginary rectangle surrounding both of the suction openings 90 . . . . The lid 94 whose inner surface is to be in contact with the second bosses 96, 96 . . . is fastened to the leg shield 43 by using the screw members 95, 95 . . . inserted through the lid 94 and screwed to the second bosses 96, 96 . . . .

An air introduction port 97 communicating with both of the suction openings 90 . . . is formed between a lower edge of the lid 94 and a lower portion of the recess portion 91. Moreover, first protrusions 98, 99 extending long in a vehicle width direction and protruding rearward are provided respectively at multiple positions, for example, two positions with an interval in the up-down direction of the recess portion 91, in such a way that a gap allowing air to flow is formed between the lid 94 and each of the first protrusions 98, 99. Second protrusions 100, 101 extending long in the vehicle width direction and protruding frontward are provided respectively at multiple positions, for example, two positions with an interval in the up-down direction of the inner surface of the lid 94, in such a way that a gap allowing air to flow is formed between the recess portion 91 and each of the second protrusions 100, 101. Furthermore, the two first protrusions 98, 99 and the two second protrusions 100, 101 are alternately arranged in the up-down direction.

Moreover, a sponge-like filter member 104 is interposed between the leg shield 43 and the lid 94 to be provided between the air introduction port 97 and both of the suction openings 90 . . . . The filter member 104 is positioned by having the first boss 92 inserted therethrough.

Incidentally, as shown in FIG. 1, the axle 102 of the front wheel WF is disposed frontward of the leg shield 43, and at least a portion of both of the suction openings 90 . . . , whole portions of both of the suction openings 90 . . . in the first embodiment, are arranged above an upper end of the front wheel WF in the side view.

Figure 9:
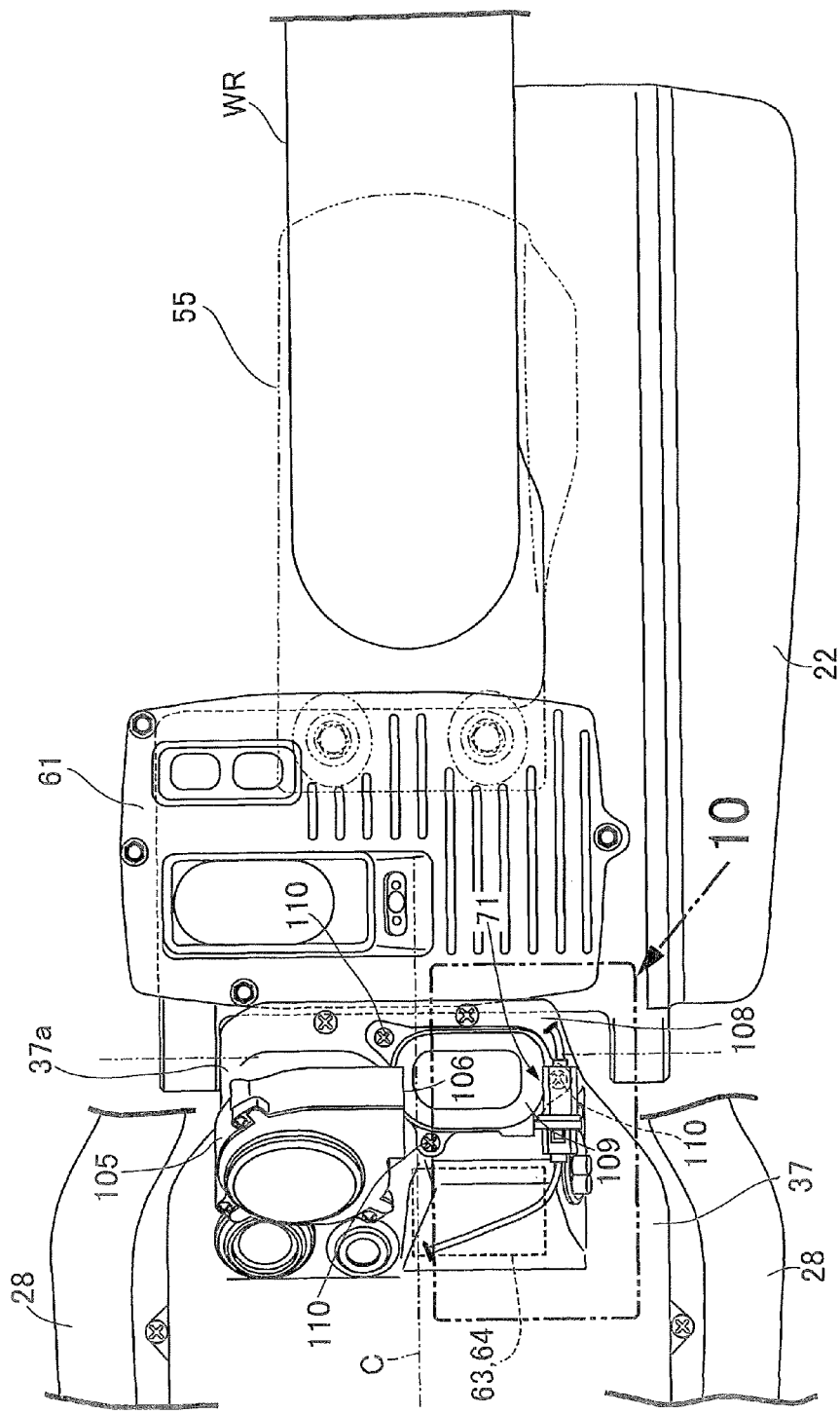
FIG. 9 is a view seen from an arrow 9 in FIG. 2. (first embodiment)

Referring also to FIG. 9, cooling air is introduced into the battery case 37 by activating a cooling fan 105 attached to a rear portion of an upper surface of the battery case 37, in the first embodiment, to an upper surface of a rising portion 37a provided in a rear portion of the upper case 79 forming part of the battery ease 37. The cooling fan 105 has its intake side connected to the rising portion 37a of the battery case 37, and an exhaust port 106 thereof is opened toward one side (toward the left in the first embodiment) of the battery case 37 in the width direction. The cooling fan 105 is attached to the upper surface of the rising portion 37a at a position offset from a center C (see FIG. 9) in the width direction of the battery case 37 to the other side (to the right in the first embodiment).

Moreover, the first and second relay switches 63, 64 provided in the circuit 74 of the high power system are housed in the rising portion 37a. As shown in FIG. 2, the first and second relay switches 63, 64 are disposed between the high voltage battery 36 and the low voltage battery 40 in the side view.

Incidentally, the power drive unit 61 disposed frontward of the rear wheel WR is provided in the front portion of the swingarm 22 which houses the electric motor 23 driving the rear wheel WR in the rear portion of the swingarm 22. The first and second relay switches 63, 64 housed in the rear portion of the battery case 37 is disposed in a region surrounded by the high voltage battery 36, the low voltage battery 40, and the power drive unit 61 in the side view. Moreover, the DC-DC converter 68 is disposed rearward of the housing box 38 while being supported by a cross member 107 (see FIG. 4) connecting both of the rear frames 29 . . . to each other and supporting the rear portion of the housing box 38.

Moreover, the fuse 62 provided in the circuit 74 of the high power system is supported by a relay board 108 which is provided on the lower case 78 forming part of the battery case 37 and which covers the rising portion 79a from the rear, and is housed between the rising portion 79a and the relay board 108. A lid member 109 covering the fuse 62 from above is fastened to the rising portion 79a of the upper case 79 by using multiple screw members 110 . . . . Furthermore, the lid member 109 is disposed to be offset from the width direction center C of the battery case 37 to one side (to the left in the first embodiment) in a plan view.

The connector 71 provided in the circuit 75 of the low power system allows switching between conduction and interruption of an electric wire forming part of the circuit 75 of the low power system leading to the low voltage battery 40 to be performed by manual operation. Touching of the fuse 62 housed between the rising portion 79a of the battery case 37 and the relay board 108 is allowed only when the circuit 75 of the low power system is interrupted by using the connector 71, by an action of touch prevention means 111.

The touch prevention means 111 is configured to allow the lid member 109 covering the fuse 62 housed between the rising portion 79a of the battery case 37 and the relay board 108 to be opened only when the circuit 75 of the low power system is interrupted by using the connector 71, and is provided by disposing the connector 71 to cover, from an opening side of the lid member 109, at least one of the multiple screw members 110 . . . fastening the lid member 109 to the rising portion 79a of the upper case 79. In other words, the connector 71 disposed to face the lid member 109 at a position on the opening side of the lid member 109 is disposed to allow the lid member 109 to be opened only when the connector 71 is manually interrupted.

Figure 10:
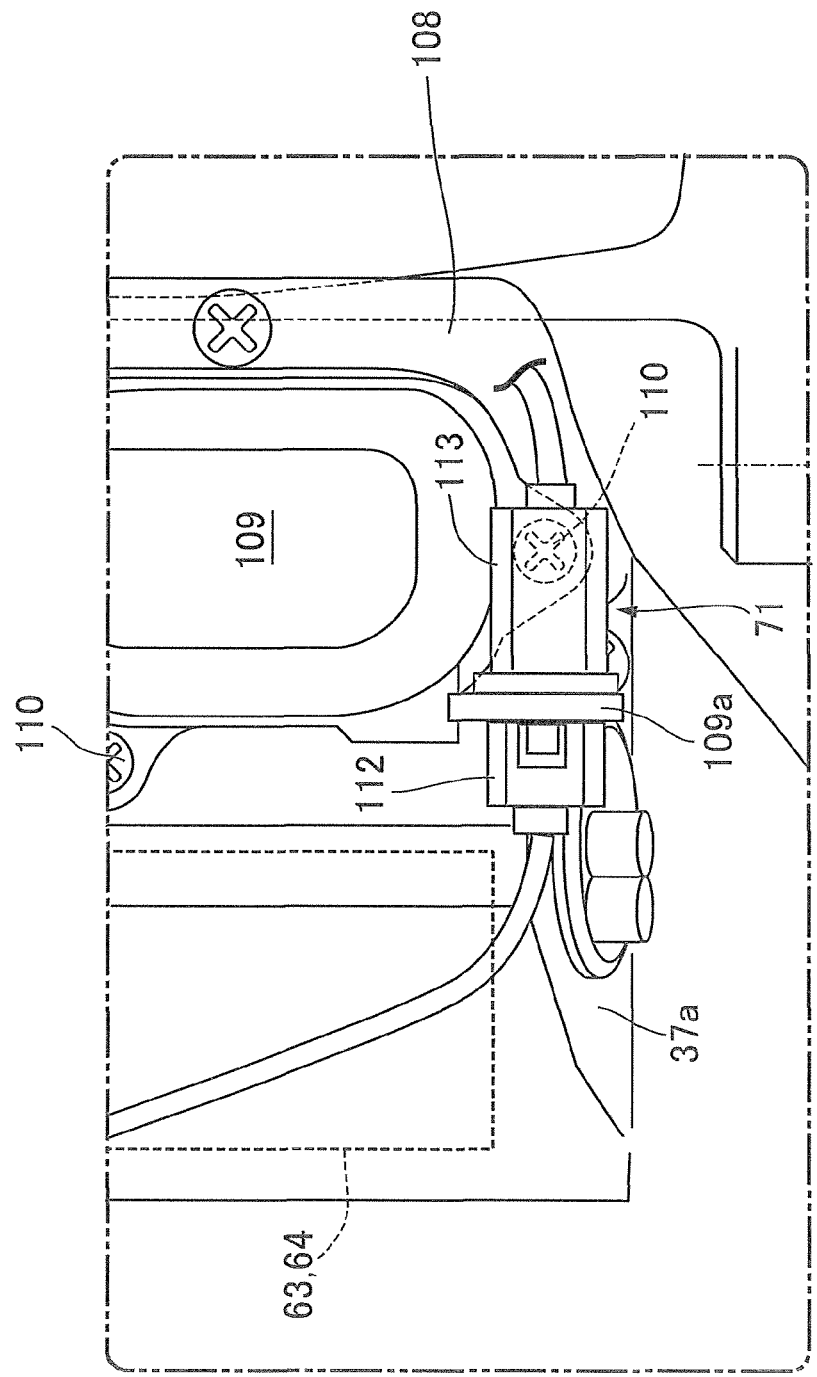
FIG. 10 is an enlarged view of a part indicated by an arrow 10 in FIG. 9. (first embodiment)
Figure 11:
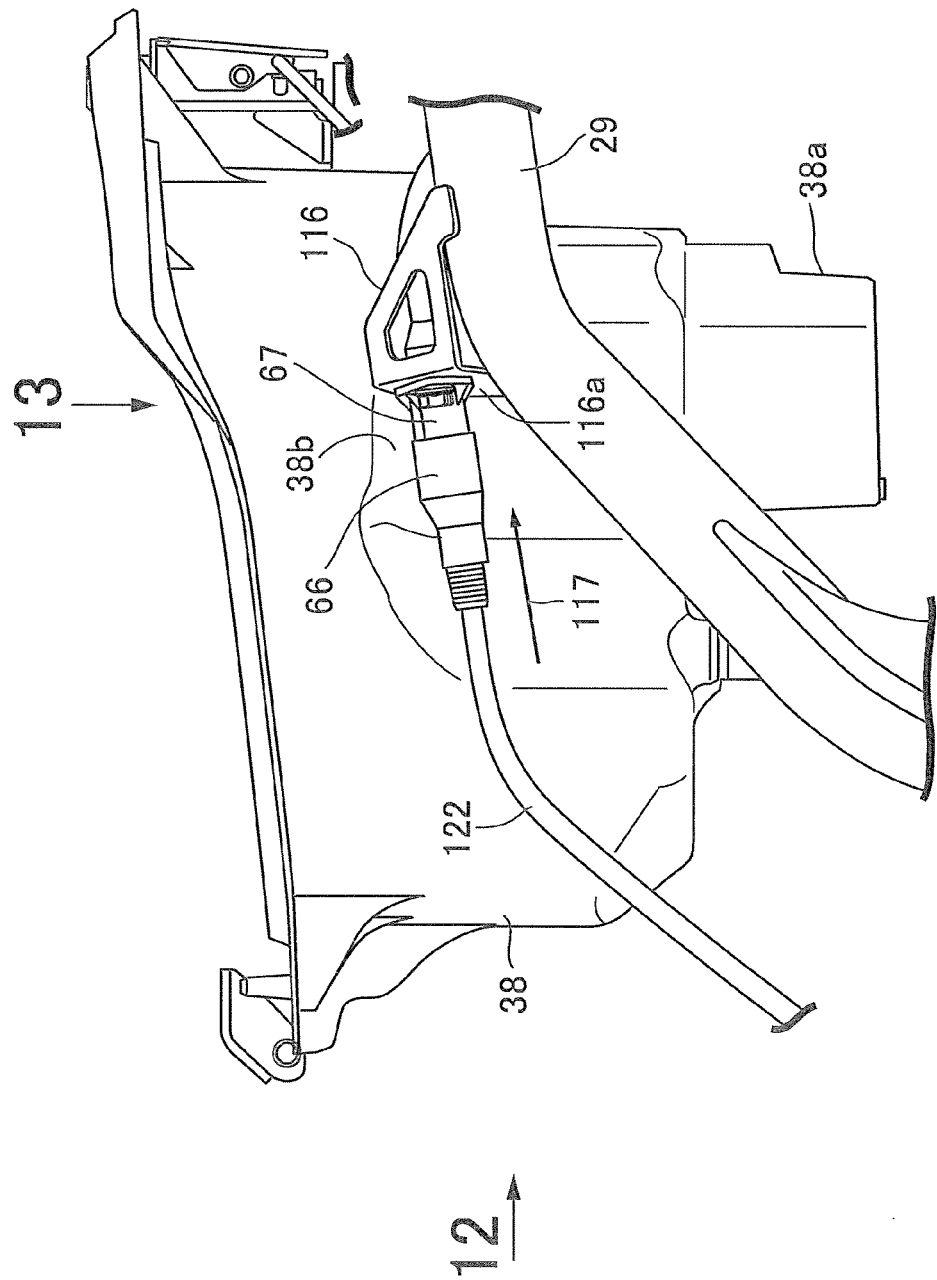
FIG. 11 is an enlarged view of an essential part in FIG. 2. (first embodiment)
Figure 12:
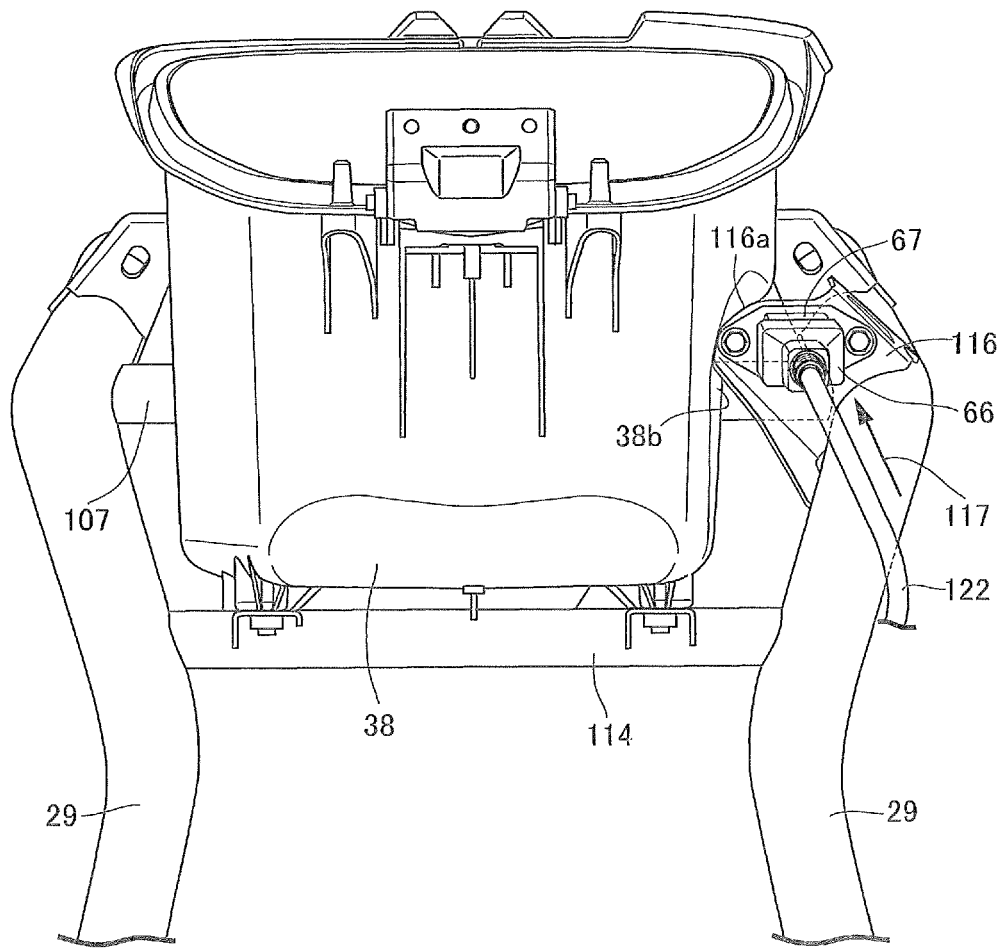
FIG. 12 is a view seen from an arrow 12 in FIG. 11. (first embodiment)
Figure 13:
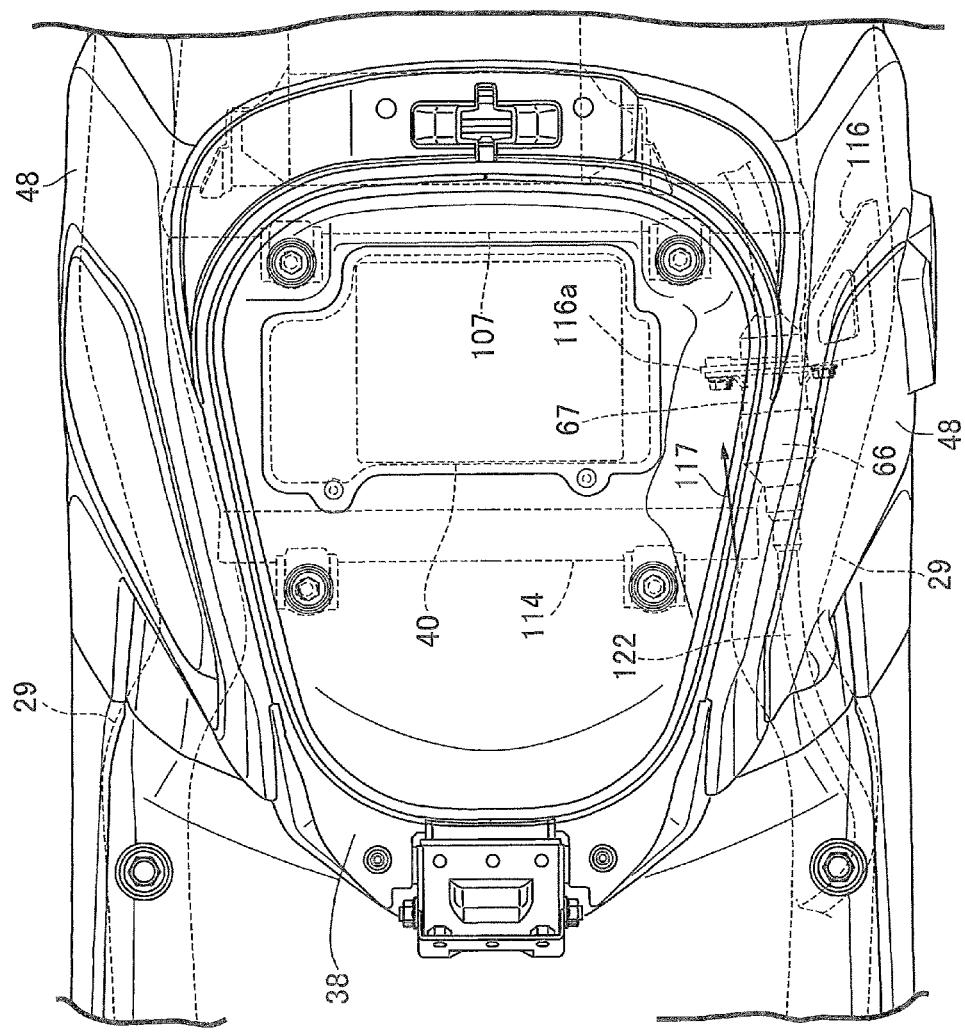
FIG. 13 is a view seen from an arrow 13 in FIG. 11. (first embodiment)
Figure 14:
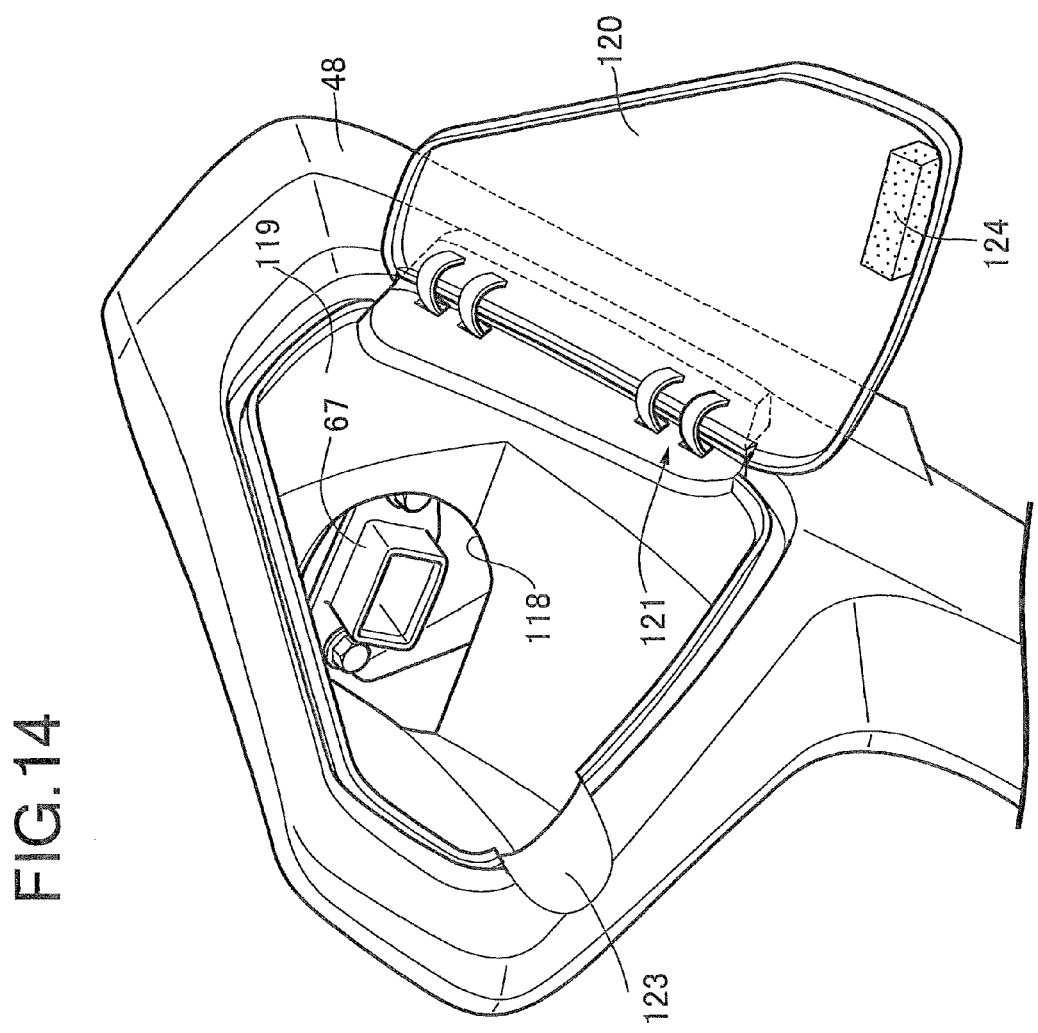
FIG. 14 is a side view showing a state in which an opening provided in a side cover is opened. (first embodiment)

Referring to FIG. 10, the connector 71 is formed of a pair of connector half bodies 112, 113 separatable from each other. The connector half body 112 of both of the connector half bodies 112, 113 is inserted through and held by a holding portion 109a provided in the lid member 109, and the connector half body 113 connected to the connector half body 112 is disposed above one of the multiple screw members 110 . . . fastening the lid member 109 to the rising portion 79a of the upper case 79.

Referring to FIGS. 11 to 14, the housing box 38 is supported by the cross member 107 provided between both of the rear frames 29 . . . and a cross member 114 provided between both of the rear frames 29 . . . at a position frontward of the cross member 107. The power-receiving-side connector 67 which is disposed between the side cover 48 on the left side and the housing box 38 is disposed on a lateral side, where the side stand 31 is disposed in the vehicle width direction, of the housing box 38 so that the power-supplying-side connector 66 leading to the charger 65 can be inserted and connected thereto. A stay 116 having an attachment portion 116a is fixed to the left rear frame 29 of the pair of right and left rear frames 29 . . . which forms part of the vehicle-body frame F and which is disposed on the lateral side of the housing box 38, the attachment portion 116a extending inward from the corresponding rear frame 29. The power-receiving-side connector 67 is attached to the attachment portion 116a.

An insertion-connection direction 117 of the power-supplying-side connector 66 to the power-receiving-side connector 67 is set to be inclined inward in the vehicle width direction toward the power-receiving-side connector 67 from the front or the rear of the power-receiving-side connector 67. In the first embodiment, the insertion-connection direction 117 of the power-supplying-side connector 66 insertable and connectable to the power-receiving-side connector 67 from the front is set to be inclined inward in the vehicle width direction toward the power-receiving-side connector 67 from the front. The insertion-connection direction 117 is a direction of a force which is applied to a hinged support of the main stand 34 during the insertion and connection of the power-supplying-side connector 66 to the power-receiving-side connector 67 and which causes the main stand 34 to be maintained on a standing position side, the main stand 34 turning forward from a housed position to be set to a standing position. In other words, the insertion-connection direction 117 is a direction toward the rear.

The side cover 48 to the left of the housing box 38 is provided with an opening 118 through which the power-receiving-side connector 67 can be seen. The opening 118 is provided in a recess portion 119. The recess portion 119 is formed in the side cover 48 to be recessed inward from an outer surface of the side cover 48.

Moreover, the opening 118 and the recess portion 119 are covered with a lid member 120 openably and closably attached to the side cover 48. The lid member 120 is supported by the side cover 48 via a hinge mechanism 121 to be set to an open position by operating it rearward in the front-rear direction of the vehicle. A rotation axis CL (see FIG. 1) of the lid member 120 is set to be inclined upward toward the rear.

Furthermore, a lead-out groove 123 is provided in a front portion of the recess portion 119. The lead-out groove 123 is used to lead out a conducting wire 122 leading to the power-supplying-side connector 66 to the outside from a space between the side cover 48 and the lid member 120 when the lid member 120 is closed while the power-supplying-side connector 66 is connected to the power-receiving-side connector 67. An elastic member 124 to be interposed between the conducting wire 122 and the lid member 120 is attached to an inner surface of the lid member 120.

In addition, a housing recess portion 38b for housing and disposing therein at least part of the power-receiving-side connector 67 (part in the first embodiment) is formed in an outer surface of a left wall of the housing box 38 by being recessed inward.

Next, an operation of the first embodiment is described. The high voltage battery 36 supplying the electric power of high voltage to the electric motor 23 generating the power to drive the rear wheel WR is housed in the battery case 37, and the cooling air is introduced into the battery case 37 from the cooling air introduction ducts 88 . . . by activating the cooling fan 105. Here, the suction openings 90 . . . opened toward the rear of the vehicle is provided in the leg shield 43, and the upstream ends of the cooling air introduction ducts 88 . . . are connected to the leg shield 43 to lead respectively to the suction openings 90 . . . . Thus, relatively clean air is more likely to be led into the battery case 37, and dusts and the like are less likely to be accumulated in an air course. Hence, increase in an air course resistance in a long term use can be suppressed.

Moreover, the recess portion 91 is formed in the leg shield 43, the recess portion 91 recessed forward from the back surface of the leg shield 43 and provided with the suction openings 90 . . . in the upper portion thereof. The air introduction port 97 communicating with the suction openings 90 . . . is formed between the lower edge of the lid 94 and the lower portion of the recess portion 91, the lid 94 covering the suction openings 90 . . . and attached to the leg shield 43. Thus, rain water is less likely to enter the cooling air introduction ducts 88 . . . from the suction openings 90 . . . . This suppresses increase of the air course resistance due to the adhesion of dust to the inner surface of the cooling air introduction ducts 88 . . . which is caused by rain water.

Furthermore, the first protrusions 98, 99 extending long in the vehicle width direction and protruding rearward are provided in the recess portion 91 in such a way that a gap allowing air to flow is formed between the lid 94 and each of the first protrusions 98, 99, and the second protrusions 100, 101 extending long in the vehicle width direction and protruding forward are provided on the inner surface of the lid 94 in such a way that a gap allowing air to flow is formed between the recess portion 91 and each of the second protrusions 100, 101. Thus, rain water can be removed by the first and second protrusions 98, 99; 100, 101. Hence, entrance of rain water into the cooling air introduction ducts 88 . . . can be more effectively prevented. The first protrusions 98, 99 serve the function of reinforcement ribs, and thus the rigidity of the leg shield 43 can be improved. The second protrusions 100, 101 serve the function of reinforcement ribs, and thus the rigidity of the lid 94 can be improved. Moreover, the multiple, for example, two first protrusions 98, 99 and the multiple, for example, two second protrusions 100, 101 are arranged alternately in the up-down direction. Thus, entrance of rain water into the cooling air introduction ducts 88 . . . can be prevented more effectively.

In addition, the sponge-like filter member 104 is interposed between the leg shield 43 and the lid 94 to be provided between the air introduction port 97 and both of the suction openings 90 . . . . Thus, air led into the battery case 37 can be made cleaner. Hence, increase in the air course resistance in a long term use can be more effectively suppressed.

Moreover, the axle 102 of the front wheel WF is disposed forward of the leg shield 43, and at least part of the suction openings 90 . . . is disposed above the upper end of the front wheel WF in the side view. Thus, the distance from a road surface to each of the suction openings 90 . . . is made relatively large. Hence, dust thrown up from the road surface can be made less likely to enter the suction openings 90 . . . .

Incidentally, the battery case 37 is disposed between the pair of right and left under frames 28 . . . extending rearward from the lower portion of the down frame 27 extending downward toward the rear from the head pipe 26, and the cooling air introduction ducts 88 . . . are disposed in the leg shield 43 to extend along the down frame 27. Thus, the leg shield 43 can be made compact even in a configuration in which the cooling air introduction ducts 88 . . . are housed in the leg shield 43. Hence, increase in size of the leg shield 43 can be suppressed. Moreover, the pair of right and left cooling air introduction ducts 88 . . . are disposed in a way that the down frame 27 is interposed therebetween from both sides. This enables increase in size of the cooling air introduction ducts 88 to be avoided while securing a sufficient amount of cooling air to be introduced into the battery case 37.

The cooling fan 105 which has its intake side connected to the battery case 37 covered with the vehicle body cover 41 and which has the exhaust port 106 thereof opened toward one side of the battery case 37 in the width direction is attached to the rear portion of the upper surface of the battery case 37 at the position offset from the width direction center C of the battery case 37 to the other side. Thus, an air course resistance caused when air exhausted from the cooling fan 105 hits the vehicle body cover 41 and is thereby deflected can be reduced.

Moreover, the fuse 62 and the first and second relay switches 63, 64 are provided in the circuit 74 of the high power system leading to the high voltage battery 36, the first and second relay switches 63, 64 capable of performing switching between connection and disconnection of the circuit 74 of the high power system by being supplied with the electric power from the circuit 75 of the low power system leading to the low voltage battery 40, and also interrupting the circuit 74 of the high power system when the circuit 75 of the low power system is interrupted. The connector 71 allowing switching between the connection and disconnection of the circuit 75 of the low power system to be performed by the manual operation is provided in the circuit 75 of the low power system. Touching of the fuse 62 for maintenance is allowed only when the circuit 75 of the low power system is interrupted by using the connector 71, by the action of the touch prevention means 111 configured to allow the lid member 109 covering the fuse 62 housed between the rising portion 79a of the battery case 37 and the relay board 108 to be opened only when the circuit 75 of the low power system is interrupted by using the connector 71.

Accordingly, the following can be said. Touching of the fuse 62 is allowed only when the circuit 75 of the low power system is interrupted, and in this state, the circuit 74 of the high power system is interrupted since the first and second relay switches 63, 64 are in an interrupted state. Thus, the interruption of the circuit 75 of the low power system by using the connector 71 is required when the maintenance of the fuse 62 is to be performed. This makes it easier to follow a work procedure in the maintenance of the fuse 62 of the high power system.

In addition, the lid member 109 is fastened to the rising portion 79a of the upper case 79 of the battery case 37 housing the high voltage battery 36, by using the multiple screw members 110 . . . . The connector 71 is disposed to face the lid member 109 at the position on the opening side of the lid member 109 in such a way that the opening of the lid member 109 is allowed when the connector 71 is manually interrupted. The touch prevention means 111 is provided by disposing the connector 71 in the following way: the connector 71 covers at least one of the multiple screw members 110 . . . from an opening side of the lid member 109 while allowing the switching between the conduction and interruption of the conductive wire forming part of the circuit 75 of the low power system to be performed by a manual operation. Thus, the touch prevention means 111 of a simple structure can be configured by allowing the lid member 109 to be opened when the connector 71 is interrupted manually.

Moreover, the fuse 62 and the lid member 109 are each disposed at a position offset from the width direction center of the battery case 37 to one side in the plan view. Thus, maintenance work from the one side of the vehicle body B in the width direction can be made easier.

Furthermore, the high voltage battery 36 is disposed between the pair of right and left under frames 28 . . . , and the low voltage battery 40 is disposed between the pair of right and left rear frames 29 . . . . Thus, the high voltage battery 36 and the low voltage battery 40 can be protected from the outside. The first and second relay switches 63, 64 are disposed between the high voltage battery 36 and the low voltage battery 40 in the side view. Thus, relay wiring can be made compact.

Moreover, the front portion of the swingarm 22 is swingably supported by the pivot plates 30 . . . provided in the front portions of both of the rear frames 29 . . . of the vehicle-body frame F. The electric motor 23 and the power drive unit 61 disposed frontward of the rear wheel WR to drive the electric motor 23 are provided in the swingarm 22. The first and second relay switches 63, 64 are disposed in the region surrounded by the high voltage battery 36, the low voltage battery 40, and the power drive unit 61 in the side view. Thus, it is possible to dispose the electrical parts of a high voltage system around the first and second relay switches 63, 64, and make wiring of the high voltage system compact.

Incidentally, the housing box 38 is disposed below the rider seat 39 on which the rider seats. The opening 118 covered with the openable and closable lid member 120 is provide in the side cover 48 covering the housing box 38 below the rider seat 39. The power-receiving-side connector 67 to which the power-supplying-side connector 66 leading to the charger 65 can be inserted and connected is fixed and disposed between an outer surface of the side cover 48 and the housing box 38 to face the opening 118. Thus, opening and closing works of the rider seat 39 covering the housing box 38 from above is unnecessary, and a charging work can be performed with the rider seat 39 closed. Hence, the charging work is made easy, and convenience is improved.

Moreover, the insertion-connection direction 117 of the power-supplying-side connector 66 to the power-receiving-side connector 67 is set to be inclined inward in the vehicle width direction toward the power-receiving-side connector 67 from the front or the rear of the power-receiving-side connector 67. Thus, even when the power-receiving-side connector 67 is disposed between the outer surface of the side cover 48 and the housing box 38, the housing box 38 is secured to have a sufficient capacity. Furthermore, the main stand 34 which turns forward from the housing position to be set to the standing position is turnably supported by the swingarm 22, and the insertion-connection direction 117 of the power-supplying-side connector 66 insertable and connectable to the power-receiving-side connector 67 from the front is set to be inclined inward in the vehicle width direction toward the power-receiving-side connector 67 from the front. Thus, the force applied to the hinged support of the main stand 34 during the insertion and the connection of the power-supplying-side connector 66 to the power-receiving-side connector 67 is applied in such a direction that the main stand 34 is maintained at the standing position. Hence, the main stand 34 does not turn undesirably to a housing position side by the insertion and connection of the power-supplying-side connector 66 to the power-receiving-side connector 67.

Furthermore, the lid member 120 is supported by the side cover 48 to be set to an open position by operating it rearward in the front-rear direction of the vehicle, and the rotation axis CL of the lid member 120 is set to be inclined upward toward the rear. Thus, the lid member 120 is set to the open position by being operated rearward about the rotation axis CL inclined upward toward the rear, and the lid member 120 has a posture inclined downward toward the rear in an open state. Hence, during the charging with the lid member 120 opened, it is possible to avoid as much as possible undesirable turning of the lid member 120 to a closing side which is caused by an effect of wind and the like.

In addition, the recess portion 119 recessed inward from the outer surface of the side cover 48 is formed in the side cover 48 in such a way that the recess portion 119 can be closed with the lid member 120, and the opening 118 is provided in the recess portion 119. Thus, a portion where the recess portion 119 is formed functions as a reinforcement rib, and the strength of the side cover 48 can be thereby improved. Furthermore, a portion inward of the side cover 48 is covered with the recess portion 119 except for the opening 118. Thus, the power-receiving-side connector 67 can be easily found, and also it is less likely to drop small objects into the portion inward of the side cover 48 when the recess portion 119 is opened.

Moreover, the housing recess portion 38b for housing and disposing therein at least a part of the power-receiving-side connector 67 is formed in an outer surface of the left wall of the housing box 38 by recessing the outer surface inward. Thus, only a required portion of the side wall of the housing box 38 is recessed, and the reduction of capacity of the housing box 38 which is caused by disposing the power-receiving-side connector 67 between the side cover 48 and the housing box 38 is suppressed to a small degree.

Furthermore, the stay 116 having the attachment portion 116a is fixed to the rear frame 29 forming part of the vehicle-body frame F and disposed to the lateral side of the housing box 38, the attachment portion 116a extending inward from the rear frame 29. The power-receiving-side connector 67 is attached to the attachment portion 116a. Thus, the side cover 48 can be easily attached to the rear frames 29 . . . without the power-receiving-side connector 67 protruding outward from the rear frame 29.

In addition, the power-receiving-side connector 67 and the opening 118 are disposed on the lateral side of the housing box 38, the lateral side on the side where the side stand 31 is disposed, the side stand 31 maintaining the standing state in which the vehicle body B is inclined to one side in the vehicle width direction. This improves workability of charging in a parked state with the side stand 31 standing.

Moreover, the power-receiving-side connector 67 to which the power-supplying-side connector 66 leading to the external power source PS via the charger 65 can be connected is connected to the high voltage battery 36 and the low voltage battery 40 via the DC-DC converter 68 disposed rearward of the housing box 38. Thus, reverse flows from the batteries 36, 40 to the power-receiving-side connector 67 are less likely to occur.

Second Embodiment

A second embodiment of the present invention is described with reference to FIGS. 15 to 20. Note that, parts corresponding to the first embodiment are illustrated simply by denoting them with the same reference numerals, and detailed descriptions thereof are omitted.

Figure 15:
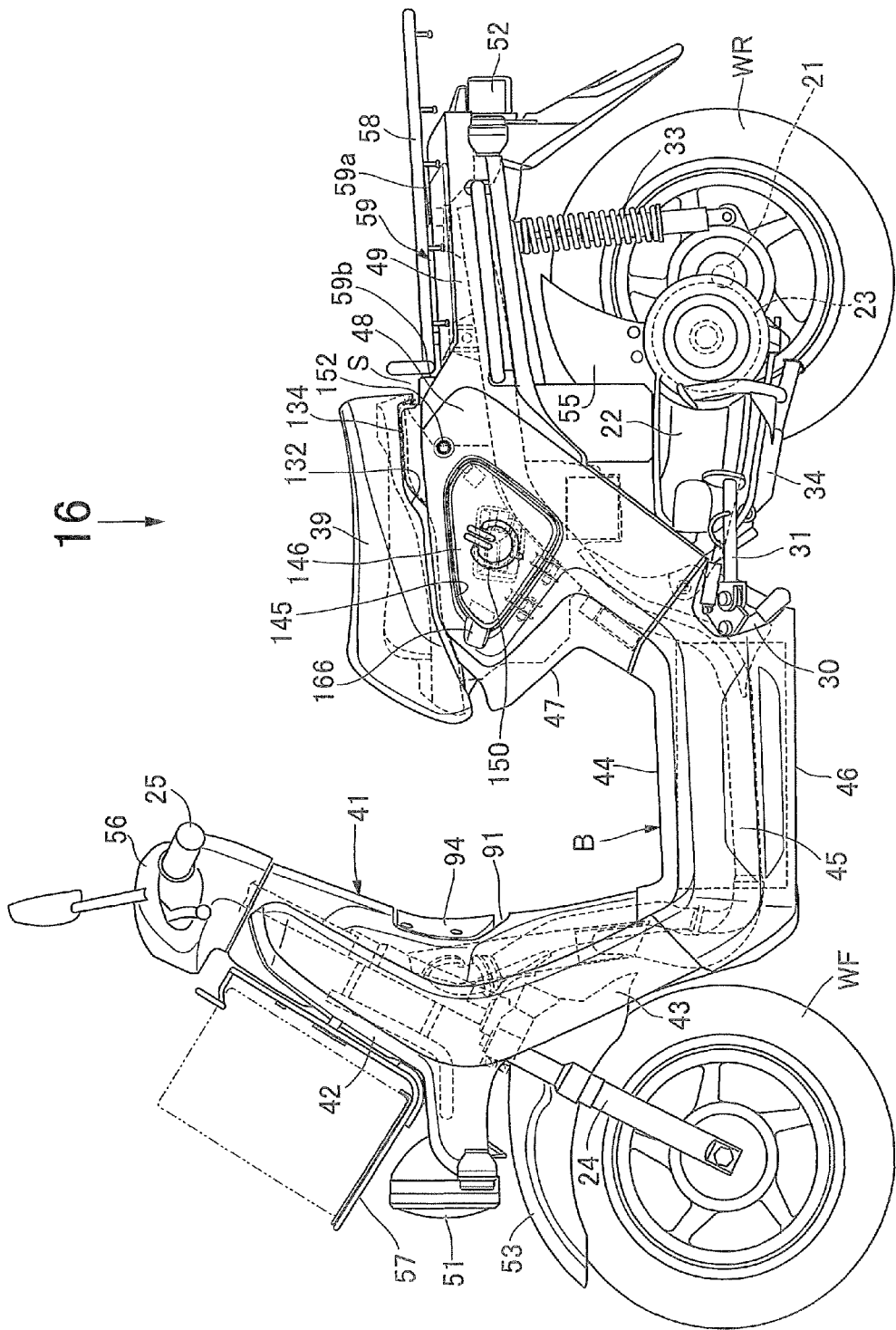
FIG. 15 is a side view of an electric two-wheeled motor vehicle according to a second embodiment. (second embodiment)
Figure 16:
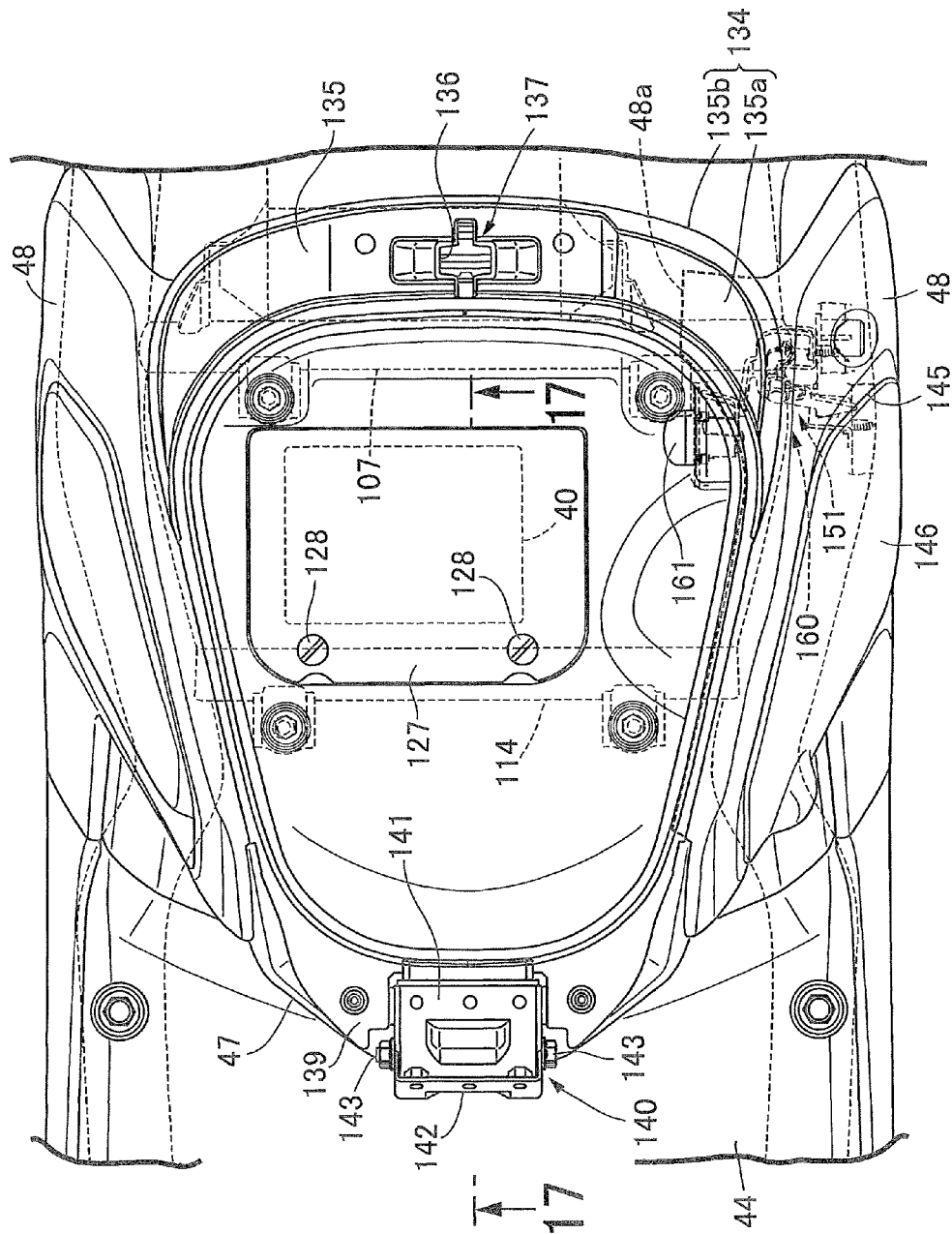
FIG. 16 is a view seen from an arrow 16 in FIG. 15 with a rider seat being omitted. (second embodiment)

At first, referring to FIG. 15, a table 59 having a flat surface portion 59a for loading cargo thereon is provided rearward of a rider seat 39 in an upper portion of a rear cover 49. In a front portion of the table 59, a stopper 59b protruding upward to a level higher than the flat surface portion 59a is provided to form a space S between the stopper 59b and a rear end of the rider seat 39 in a side view. Moreover, a rear carrier 58 disposed above the table 59 is detachably attached to rear frames 29 . . . .

Referring also to FIGS. 16 to 19, a housing box 38 is formed to have a box shape whose upper end is opened in a way that an upper end opening is closeable by the rider seat 39. The housing box 38 is supported on a pair of rear and front cross members 107, 114 provided between both of the rear frames 29, 29 in a vehicle-body frame F. Moreover, a battery housing portion 38a protrudes downward from a rear lower portion of the housing box 38 at a position which is rearward of the front cross member 114 among both of the cross members 107, 114 and which is offset to one side (right side in this embodiment) from a center of a vehicle body B in a vehicle width direction. A lid member 127 for closing from above the battery housing portion 38a housing a low voltage battery 40 is fastened to a lower portion of the housing box 38 by multiple, for example, a pair of screw members 128, 128.

The rider seat 39 is formed by providing a cushion material 130 on a bottom plate 129. A seat-side recess portion 132 recessed upward is formed in a left or right portion, left portion in this embodiment, of a rear portion of the rider seat 39. Meanwhile, in a portion in the rear portion of the housing box 38 which corresponds to the seat-side recess portion 132, a grip portion 134 forming a box-side recess portion 133 recessed upward is provided to be housed in the seat-side recess portion 132.

Moreover, a pair of right and left guide plate portions 129a . . . for assisting smooth opening and closing of the rider seat 39 is provided in the bottom plate 129 of the rider seat 39 to be inserted into the housing box 38 along inner surfaces of right and left side walls of the housing box 38 when the rider seat 39 is closed. Ribs 129b . . . extending in an up-down direction are provided in the guide plate portions 129a . . . in a protruding manner.

Incidentally, a box-side rear flange portion 135 projecting rearward is provided in an upper end of the rear portion of the housing box 38. The grip portion 134 forming the box-side recess portion 133 is formed of a raised portion 135a which is formed by raising part of the box-side rear flange portion 135 upward and of a downwardly-extending portion 135b extending downward from a tip end of the box-side rear flange portion 135.

Moreover, the seat-side recess portion 132 and the box-side recess portion 133 are formed to extend to a rear surface side of the rider seat 39. A left side cover 48 among side covers 48 . . . covering a portion below the rider seat 39 from both sides is provided integrally with a cover-side flange portion 48a projecting inward from an upper end of the left side cover 48. The cover-side flange portion 48a covers the seat-side recess portion 132 and the box-side recess portion 133 from below.

A seat catch opening 136 is provided in a center portion of the box-side rear flange portion 135. A hook (not illustrated) to be inserted through the seat catch opening 136 in a closed state of the rider seat 39 is provided in a rear lower portion of the rider seat 39. A seat catch mechanism 137 (see FIG. 16) capable of maintaining the closed state of the rider seat 39 by disengageably engaging with the hook interested through the seat catch opening 136 is supported by a supporting plate 138 attached to the cross member 107.

A box-side front flange portion 139 is provided integrally with a front end of the housing box 38, the box side front flange portion 139 extending frontward from an upper end of the front end of the housing box 38. A front lower portion of the rider seat 39 is turnably supported by a center portion of the box-side front flange portion 139 in the width direction via a hinge mechanism 140.

The hinge mechanism 140 is configured in such a manner that a turning plate 142 is turnably supported by a bracket 141 fixed to the center portion of the box-side front flange portion 139 in the width direction via a pair of right and left shafts 143 . . . having a same horizontal axis. The turning plate 142 is fixed to a lower surface of the bottom plate 129 in a front portion of the rider seat 39.

Figure 17:
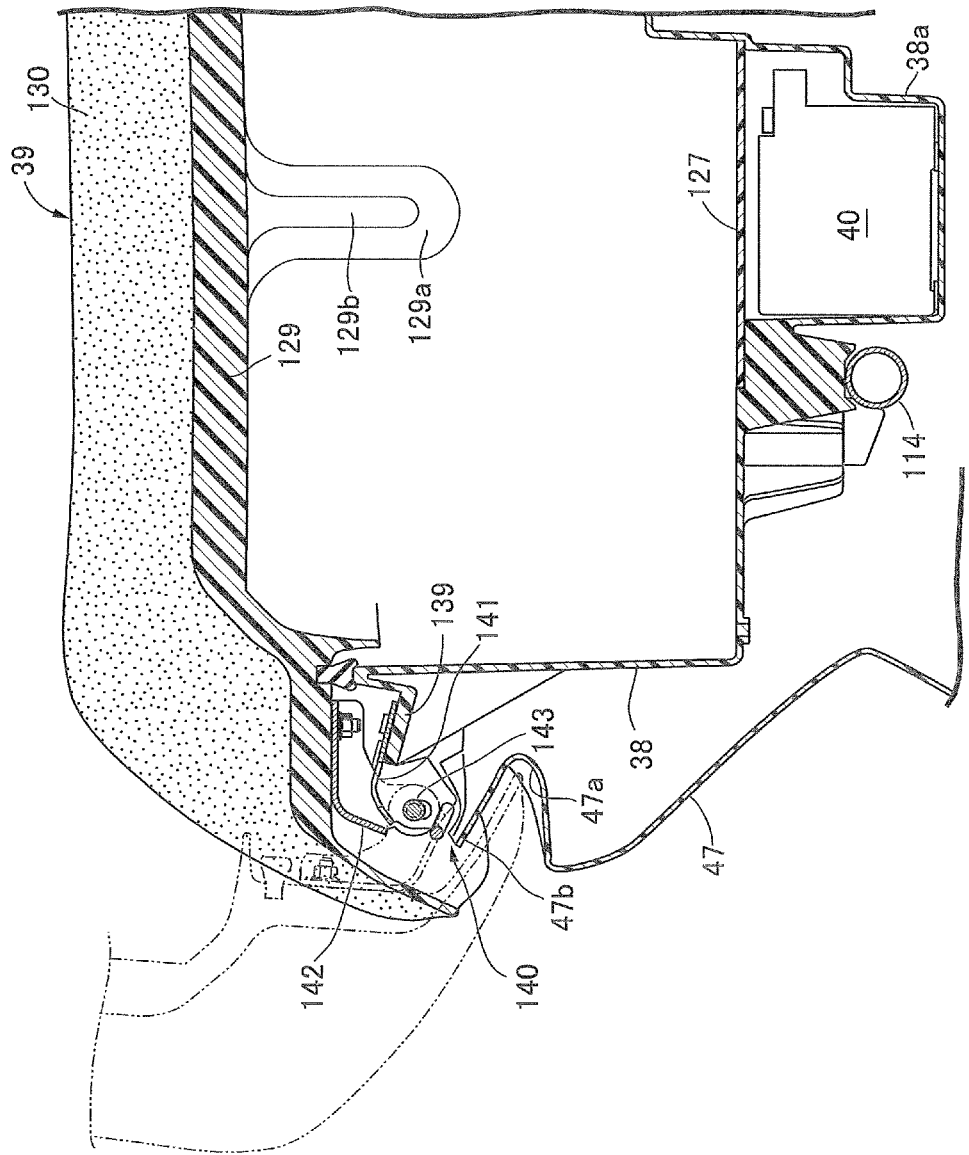
FIG. 17 is a sectional view taken along a line 17-17 in FIG. 16. (second embodiment)
Figure 18:
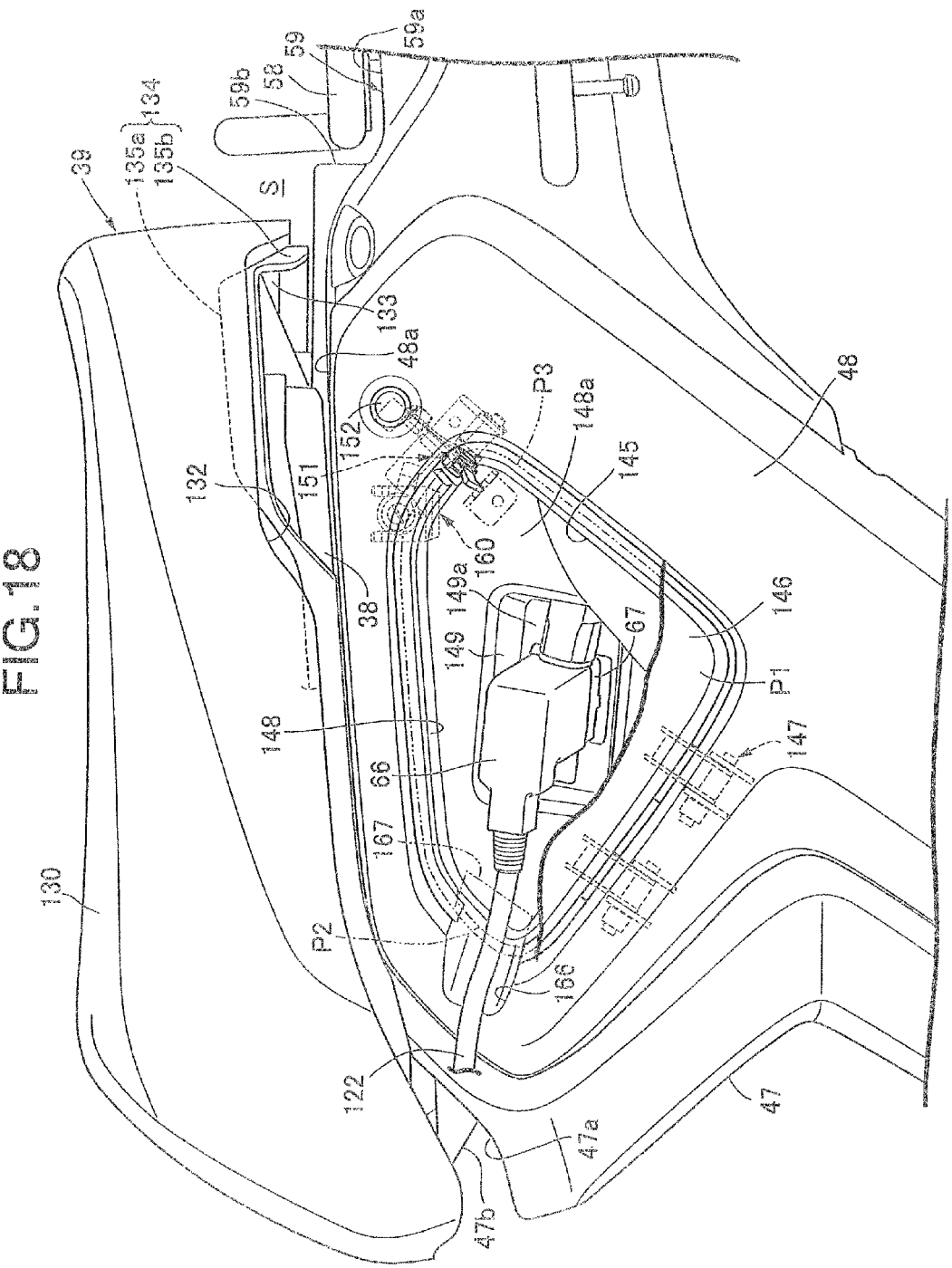
FIG. 18 is an enlarged view of an essential part in FIG. 15 in a charging condition with a part of a lid member being omitted. (second embodiment)
Figure 19:
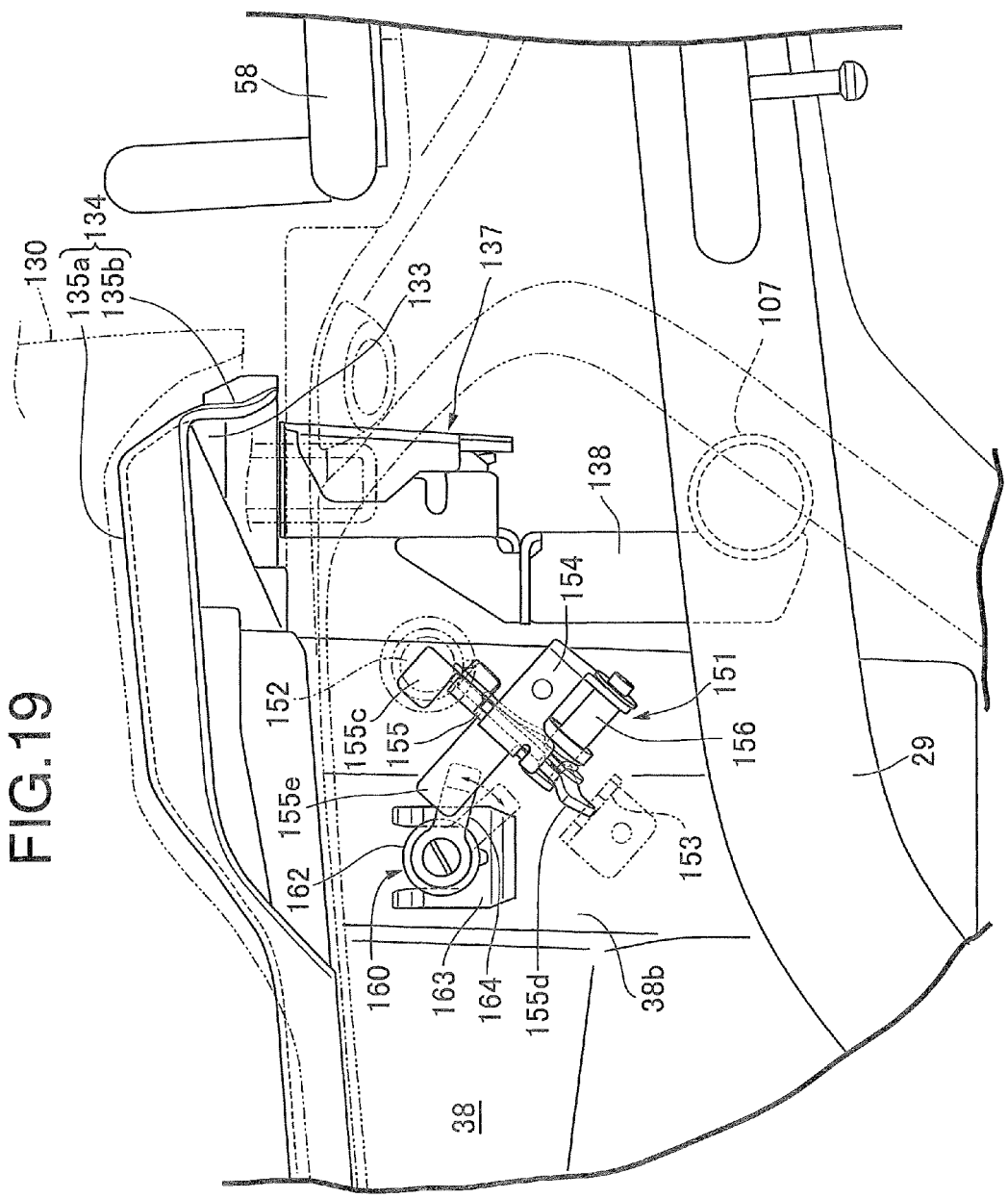
FIG. 19 is a view of a housing box seen from a right side with a side cover being omitted. (second embodiment)

Moreover, the hinge mechanism 140 is covered from the front with the front portion of the rider seat 39, and is also covered from below with an under-seat-portion front cover 47 covering the portion below the rider seat 39 from the front. Specifically, a recess portion 47a for avoiding contact with a front end of the rider seat 39 when the rider seat 39 is opened as shown by chain lines of FIG. 17 is provided in an upper portion of the under-seat-portion front cover 47 to be recessed rearward, and a protruding piece 47b extending upward toward the front from the recess portion 47a to cover the hinge mechanism 140 from below is formed integrally with the recess portion 47a.

Incidentally, in the left side cover 48 among the right and left side covers 48 . . . , an opening 145 which a power-receiving-side connector 67 connectable with a power-supplying-side connector 66 faces is provided below the rider seat 39. A lid member 146 capable of covering the opening 145 is turnably supported by the side cover 48 via a hinge mechanism 107.

In the left side cover 48, a large recess portion 148 having the opening 145 as an opening end is formed to be recessed inward. A rectangular small recess portion 149 recessed further inward is provided in a center portion of an inner-end closing wall 148a of the large recess portion 148. The power-receiving-side connector 67 is fixed to an inner-end closing wall 149a of the small recess portion 149 while being disposed between an outer surface of the side cover 48 and the housing box 38. Moreover, the inner-end closing walls 148a, 149a are inclined in such a way that upper portions thereof are located more inward. This allows the power-supplying-side connector 66 to be connected to the power-receiving-side connector 67 by inserting it from obliquely above. Thus, the connection work of the power-supplying-side connector 66 to the power-receiving-side connector 67 can be made easy.

Moreover, the lid member 146 is formed to have a substantially triangular shape having three vertex portions of P1, P2, P3. The opening 145 is also formed to have a substantially triangular shape in a manner corresponding to the lid member 146. Moreover, the lid member 146 is turnably supported by the side cover 48 such that the lid member 146 is in a posture with the vertex portion P1 among the vertex portions P1 to P3 being directed downward in the closed state of the opening 145.

Furthermore, a design mark 150 (see FIG. 15) showing that the power-receiving-side connector 67 is disposed inside the lid member 146 is provided on an external design surface of the lid member 146.

Figure 20:
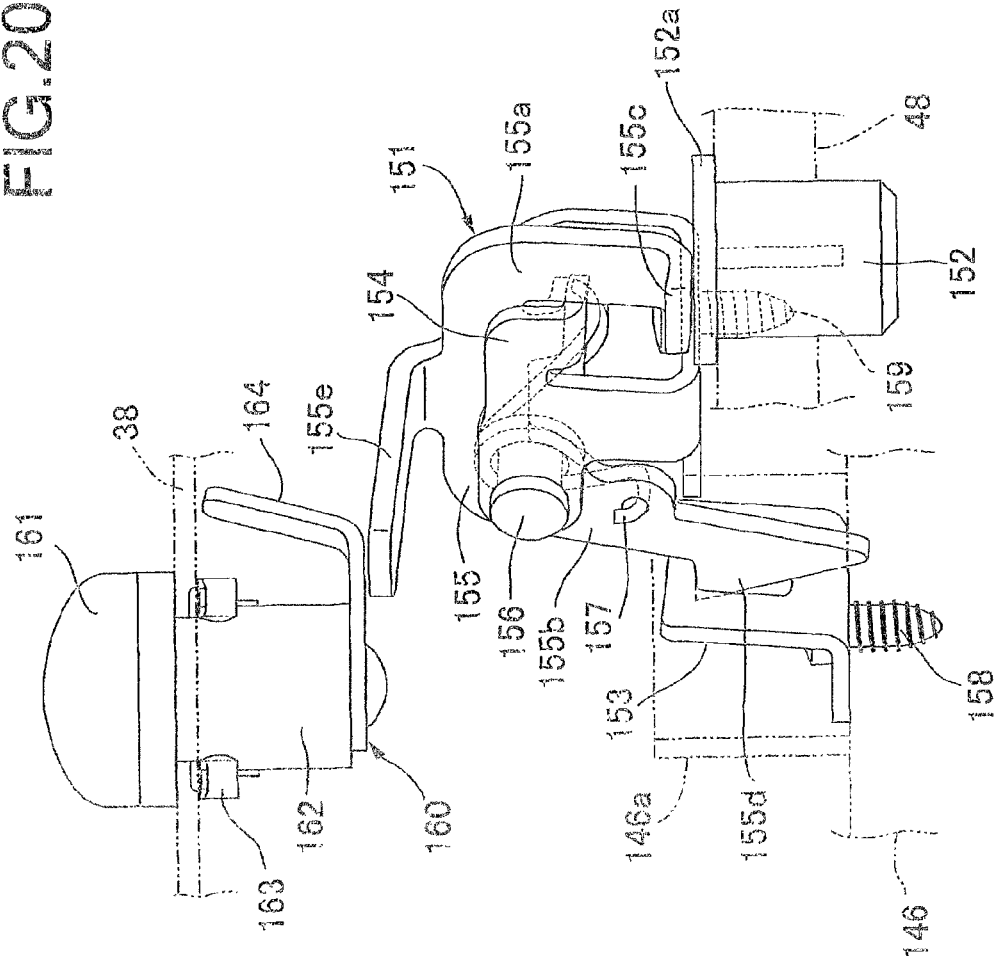
FIG. 20 is a plan view showing configurations of a closed state maintaining mechanism and restriction means. (second embodiment)

Referring also to FIG. 20, a closed state maintaining mechanism 151 is provided between the lid member 146 and the side cover 48. The closed state maintaining mechanism 151 can be switched between a lock state where the lid member 146 is maintained at a closed position and an unlock state where an opening operation of the lid member 146 is allowed, in accordance with an operation of a push button 152 being an operator disposed near the opening 145 to face a surface of the side cover 48.

The closed state maintaining mechanism 151 includes a hook 153, a bracket 154, a turning member 155, and a torsion spring 157. The hook 153 is housed in a protruding portion 146a provided on the inner-surface side of the lid member 146, and is fastened to the lid member 146 by using a screw member 158. The bracket 154 is fastened to the inner surface of the side cover 48 by using a screw member 159. The turning member 155 is turnably supported by the bracket 154 via a pivot 156. The torsion spring 157 surrounds the pivot 156, and is provided between the bracket 154 and the turning member 155.

The turning member 155 integrally has a first arm portion 155a extending from the pivot 156 toward the push button 152, a second arm portion 155b extending from the pivot 156 toward the hook, a contact plate portion 155c provided at a tip end of the first arm portion 155a and being in contact with an inner end of the push button 152, and an engagement claw 155d provided at a tip end of the second arm portion 155b to be engageable with the hook 153. The torsion spring 157 push the contact plate portion 155c against the push button 152 and biases the turning member 155 in such a direction that the engagement claw 155d engages with the hook 153.

The push button 152 is supported by the side cover 48 in a way that an outer end of the push button 152 protrudes from the surface of the side cover 48 at a position obliquely rearward and upward of the opening 145. A flange portion 152a provided at an inner end of the push button 152 engages with the inner surface of the side cover 48, and thus the push button 152 is prevented from falling off from the side cover 48.

When an operation of pushing the push button 152 against a spring force of the torsion spring 157 is performed, the turning member 155 of the closed state maintaining mechanism 151 turns to cause the engagement claw 155d to be disengaged from the hook 153, and thus the opening operation of the lid member 146 can be performed in this state.

Moreover, when the lid member 146 is closed, the engagement claw 155d engages with the hook 153 by the spring force of the torsion spring 157, and thus the closed state of the lid member 146 is maintained. In other words, the closed state maintaining mechanism 151 is switched between the lock state where the lid member 146 is maintained at the closed position in a non-operation state of the push button 152 and the unlock state where the opening operation of the lid member 146 is allowed in accordance with the operation of the push button 152.

Incidentally, the closed state maintaining mechanism 151 is provided between the lid member 146 and the side cover 48, in a certain vertex portion P3 among the vertex portions P1 to P3 in the lid member 146. The lid member 146 is turnably supported by the side cover 48 via a hinge mechanism 147 on a side portion of the side cover 48 on the opposite side to the certain vertex portion P3.

The switching work of the push button 152 of switching the closed state maintaining mechanism 151 from the lock state to the unlock state can be restricted by restriction means 160. The restriction means 160 is configured to mechanically work in accordance with a turning operation of a turnable control knob 161 being a switch operator. The control knob 161 is disposed in the housing box 38 in a manner that the turning operation of the control knob 161 can be performed in the housing box 38.

The restriction means 160 includes a supporting tube 162 and a turn restriction arm 164. The supporting tube 162 penetrates the housing box 38 to be fixedly supported by a supporting frame 163 fixed to an outer side surface of the housing box 38, and turnably supports the control knob 161. The turn restriction arm 164 is linked and connected to the control knob 161 to turn by the turning operation of the control knob 161, and extends laterally from an outer end of the supporting tube 162. Moreover, a restriction protruding portion 155e is provided integrally with the turning member 155. The restriction protruding portion 155e restricts the turning member 155 to turn in such a direction in that switching from the lock state to the unlock state is performed, by being brought into contact with the turn restriction arm 164.

In other words, the restriction means 160 includes the control knob 161 used for switching between a restricted state where the switching of the closed state maintaining mechanism 151 from the lock state to the unlock state is restricted and a non-restricted state where the switching of the closed state maintaining mechanism 151 from the lock state to the unlock state is allowed. The portions of the restriction means 160 except for the control knob 161 are disposed between the housing box 38 and the side cover 48, and are housed in a housing recess portion 38b provided in a side wall of the housing box 38 and recessed inward.

Incidentally, a groove 166 for leading out a conductive wire 122 leading to the power-supply-side connector 66 in the closed state of the lid member 146 is provided in the side cover 48 to be continuous with a front upper portion of the opening 145. An elastic member 167 is interposed between the conductive wire 122 and at least one of the lid member 146 and the side cover 48, the conductive wire 122 interposed between the lid member 146 in the closed state and the side cover 48. In this embodiment, the elastic member 167 is fixedly attached to the inner surface of the lid member 146.

Next, an operation of the second embodiment is described. The seat-side recess portion 132 recessed upward is formed in the left or right portion of the rear portion of the rider seat 39. In the portion in the rear portion of the housing box 38 which corresponds to the seat-side recess portion 132, the grip portion 134 forming the box-side recess portion 133 recessed upward is provided to be housed in the seat-side recess portion 132. Thus, the grip portion 134 is easily visible from the side, and the grip portion 134 can be thereby easily found. Moreover, even when cargo is loaded on the table 59, the grip portion 134 can be smoothly gripped regardless of the amount of the cargo since the grip portion 134 is provided in the left or right portion of the rear portion of the housing box 38 frontward of the table 59. This configuration allows the grip portion 134 used to set the vehicle body to a standing state to be secured while avoiding increase in size of the housing box 38 and avoiding increase in numbers of parts and attachment steps.

Moreover, the seat-side recess portion 132 and the box-side recess portion 133 are formed to extend to the rear surface side of the rider seat 39. Thus, the vehicle body B can be easily pulled rearward when the vehicle body B is made to stand by using a main stand 34. Hence, a work of making the vehicle body B stand is facilitated.

Furthermore, the stopper 59b protruding upward to a level higher than the flat surface portion 59a for loading cargo thereon is provided in the front portion of the table 59 to form the space S between the stopper 59b and the rear end of the rider seat 39 in the side view. Thus, a hand can be inserted into the space between the stopper 59b and the rear end of the rider seat 39 to reach for the rear surface side of the rider seat 39 even when cargo is loaded on the flat surface portion 59a of the table 59. Thus, the work of making the main stand 34 stand is facilitated.

In addition, the portion below the rider seat 39 is covered with the side covers 48 . . . from both sides, and the cover-side flange portion 48a covering the seat-side recess portion 132 and the box-side recess portion 133 from below is provided to project inward from the upper end of the side cover 48 on the side where the seat-side recess portion 132 and the box-side recess portion 133 are provided. Thus, the inside of the vehicle body B can be made hardly visible from a space opened by forming the seat-side recess portion 132 and the box-side recess portion 133.

Moreover, the front lower portion of the rider seat 39 is turnably supported by the box-side front flange portion 139 via the hinge mechanism 140, the box-side front flange portion 139 provided at the front end of the housing box 38 to extend frontward from the upper end of the front portion of the housing box 38. The hinge mechanism 140 is covered from the front with the front portion of the rider seat 39, and is covered from below with the under-seat-portion front cover 47 covering the portion below the rider seat 39 from the front. This makes the hinge mechanism 140 less visible from the outside and leads to improvement of aesthetics.

Moreover, the box-side rear flange portion 135 projecting rearward is provided at the upper end of the rear portion of the housing box 38. The grip portion 134 forming the box-side recess portion 133 is formed of the raised portion 135a which is formed by raising part of the box-side rear flange portion 135 upward and of the downwardly-extending portion 135b extending downward from the tip end of the box-side rear flange portion 135. Thus, the downwardly-extending portion 135b can suppress reduction in rigidity of the grip portion 134 and the box-side rear flange portion 135 which is caused by the formation of the box-side recess portion 133.

Incidentally, the opening 145 which the power-receiving-side connector 67 connectable with the power-supplying-side connector 66 linked to an external power source PS via a charger 65 faces is provided in the left side cover 48. The lid member 146 capable of covering the opening 145 is turnably supported by the left side cover 48 via the hinge mechanism 147. The closed state maintaining mechanism 151 is provided between the lid member 146 and the side cover 48, the closed state maintaining mechanism 151 switched between the lock state where the lid member 146 is maintained at the closed position in the non-operation state of the push button 152 disposed to face the surface of the side cover 48 at a position near the opening 145 and the unlock state where the opening operation of the lid member 146 is allowed in accordance with the operation of the push button 152.

Thus, closing and opening works of the rider seat 39 covering the housing box 38 from above is not required, and the charging work can be performed with the rider seat 39 closed. Moreover, the disposed position of the push button 152 can be found quickly, and the lid member 146 can be opened to perform the charging work by simply operating the push button 152. Thus, the charging work can be made simple. Particularly, setting the button 152 to the unlock state allows the lid member 146 to be readily opened at any time, and the charging can be quickly performed. Moreover, setting the button 152 to the lock state as needed makes it impossible for a third party to open the lid member 146. Thus, the state can be selected in accordance with the usage.

Moreover, the closed state maintaining mechanism 151 is provided between the lid member 146 and the side cover 48, in a certain vertex portion P3 among the three vertex portions P1 to P3 in the lid member 146 formed to have the substantially triangular shape. The lid member 146 is turnably supported by the side cover 48 via the hinge mechanism 147 on the side portion of the side cover 48 on the opposite side to the certain vertex portion P3. Thus, a gap between the lid member 146 and the side cover 48 which is made by an external force can be made small, and this achieves a tamper-proof function.

Furthermore, the design mark 150 showing that the power-receiving-side connector 67 is disposed inside the lid member 146 is provided on the external design surface of the lid member 146. This allows the place where the power-receiving-side connector 67 is disposed to be found quickly when the charging work is to be performed, and leads to improvement in the efficiency of the charging work.

In addition, in the closed state, the lid member 146 is in such a posture that the vertex portion P1 among the vertex portions P1 to P3 is directed downward. Thus, when the opening 145 is closed, rain water and the like attached to the lid member 146 can be collected to the vertex portion P1 at a low position and removed.

Moreover, the conductive wire 122 leading to the power-supply-side connector 66 is interposed between the lid member 146 in the closed state and the side cover 48 with the elastic member 167 interposed between the conductive wire 122 and at least one of the lid member 146 and the side cover 48. Thus, the lid member 146 can be set to the closed state during the charging.

Furthermore, the switching work of switching the closed state maintaining mechanism 151 from the lock state to the unlock state is restricted by using the restriction means 160. This is effective when it is desired to restrict the switching work of the push button 152 of switching the closed state maintaining mechanism 151 from the lock state to the unlock state.

Moreover, the control knob 161 forming part of the restriction means 160 is capable of being operated in the housing box 38. Thus, the closed state maintaining mechanism can be utilized in a manner suiting the usage of the rider.

Furthermore, the portions of the restriction means 160 other than the control knob 161 are disposed between the housing box 38 and the side cover 48. Thus, the restriction means 160 is made more compact, and a charging port structure including the restriction means 160 and the closed state maintaining mechanism 151 can be thereby made more compact.

In addition, the restriction means 160 is configured to mechanically work by the turning operation of the control knob 161. Thus, increase in cost is suppressed and a power source causing the restriction means 160 to work is not required.

Embodiments of the present invention have been described above. However, the present invention is not limited to the embodiments described above, and various design changes can be made without departing from the gist of the present invention.

For example, in the above-described embodiments, the descriptions are given of the case where the charger 65 is disposed outside the vehicle. However, the configuration may be such that a power-receiving-side connector is connected to the charger 65 mounted in an electric two-wheeled motor vehicle, and a power-supplying-side connecter leading to an external power source outside the vehicle is connected to the power-receiving-side connector.

The invention claimed is:

1. An electric two-wheeled motor vehicle including: an electric motor (23) for generating power to drive a rear wheel (WR); a battery (36) for supplying electric power to the electric motor (23); a rider seat (39) on which a rider seats; a housing box (38) disposed below the rider seat (39); and a side cover (48) covering the housing box (38) below the rider seat (39), the electric two-wheeled motor vehicle configured to allow charging of the battery (36),
   characterized in that
   an opening (118, 145) covered with an openable and closeable lid member (120, 146) is provided in the side cover (48),
   a power-receiving-side connector (67) to which a power-supplying-side connector (66) leading to an external power source (PS) is capable of being inserted and connected is fixed and disposed between an outer surface of the side cover (48) and an outer surface of a side wall of the housing box (38) to face the opening (118, 145), and
   an insertion-connection direction (117) of the power-supplying-side connector (66) to the power-receiving-side connector (67) is set to be inclined inward in a vehicle width direction toward the power-receiving-side connector (67) from front or rear of the power-receiving-side connector (67).

2. An electric two-wheeled motor vehicle including: an electric motor (23) for generating power to drive a rear wheel (WR); a battery (36) for supplying electric power to the electric motor (23); a rider seat (39) on which a rider seats; a housing box (38) disposed below the rider seat (39); and a side cover (48) covering the housing box (38) below the rider seat (39), the electric two-wheeled motor vehicle configured to allow charging of the battery (36),
   characterized in that
   an opening (118, 145) covered with an openable and closeable lid member (120, 146) is provided in the side cover (48),
   a power-receiving-side connector (67) to which a power-supplying-side connector (66) leading to an external power source (PS) is capable of being inserted and connected is fixed and disposed between an outer surface of the side cover (48) and an outer surface of a side wall of the housing box (38) to face the opening (118, 145), and
   a housing recess portion (38b) for housing and disposing therein at least part of the power-receiving-side connector (67) is formed in part of the outer surface of the side wall of the housing box (38) to be recessed inward.

3. An electric two-wheeled motor vehicle including: an electric motor (23) for generating power to drive a rear wheel (WR); a battery (36) for supplying electric power to the electric motor (23); a rider seat (39) on which a rider seats; a housing box (38) disposed below the rider seat (39); and a side cover (48) covering the housing box (38) below the rider seat (39), the electric two-wheeled motor vehicle configured to allow charging of the battery (36),
characterized in that
an opening (118, 145) covered with an openable and closeable lid member (120, 146) is provided in the side cover (48),
a stay (116) having an attachment portion (116a) is fixed to a frame member (29) disposed on a lateral side of the housing box (38) and forming part of a vehicle-body frame (F), the attachment portion (116a) extending inward from the frame member (29), and
a power-receiving-side connector (67) to which a power-supplying-side connector (66) leading to an external power source (PS) is capable of being inserted and connected is disposed between an outer surface of the side cover (48) and an outer surface of a side wall of the housing box (38) to face the opening (118, 145), and is attached to the attachment portion (116a).

4. An electric two-wheeled motor vehicle including: an electric motor (23) for generating power to drive a rear wheel (WR); a battery (36) for supplying electric power to the electric motor (23); a rider seat (39) on which a rider seats; a housing box (38) disposed below the rider seat (39); and a side cover (48) covering the housing box (38) below the rider seat (39), the electric two-wheeled motor vehicle configured to allow charging of the battery (36),
characterized in that
an opening (145) covered with an openable and closeable lid member (146) is provided in the side cover (48),
a power-receiving-side connector (67) to which a power-supplying-side connector (66) leading to an external power source (PS) is capable of being inserted and connected is fixed and disposed between an outer surface of the side cover (48) and an outer surface of a side wall of the housing box (38) to face the opening (145),
the lid member (146) is turnably supported by the side cover (48) via a hinge mechanism (147), and
a closed state maintaining mechanism (151) is provided between the lid member (146) and the side cover (48), the closed state maintaining mechanism (151) switching between a lock state where the lid member (146) is maintained at a closed position in a non-operation state of an operator (152) disposed to face a surface of the side cover (48) at a position near the opening (145) and an unlock state where an opening operation of the lid member (146) is allowed in accordance with an operation of the operator (152).

5. The electric two-wheeled motor vehicle according to any one of claims 2 to 4, wherein an insertion-connection direction (117) of the power-supplying-side connector (66) to the power-receiving-side connector (67) is set to be inclined inward in a vehicle width direction toward the power-receiving-side connector (67) from front or rear of the power-receiving-side connector (67).

6. The electric two-wheeled motor vehicle according to claim 1, further comprising a main stand (34) configured to turn forward from a housed position to a standing position, wherein
the insertion-connection direction (117) of the power-supplying-side connector (66) insertable and connectable to the power-receiving-side connector (67) from the front is set to be inclined inward in the vehicle width direction toward the power-receiving-side connector (67) from the front.

7. The electric two-wheeled motor vehicle according to any one of claims 1, 2, 3 and 6, wherein
the lid member (120) is supported by the side cover (48) such that the lid member (120) is set to an open position by being operated rearward in a front-rear direction of the vehicle, and
a turning axis of the lid member (120) is set to be inclined upward toward the rear.

8. The electric two-wheeled motor vehicle according to any one of claims 1, 2, 3, 4 and 6, wherein
a recess portion (119) recessed inward from an outer side surface of the side cover (48) is formed in the side cover (48) to be closable by the lid member (120), and
the opening (118) is provided in the recess portion (119).

9. The electric two-wheeled motor vehicle according to any one of claims 1, 3, 4 and 6, wherein a housing recess portion (38b) for housing and disposing therein at least part of the power-receiving-side connector (67) is formed in part of the outer surface of the side wall of the housing box (38) to be recessed inward.

10. The electric two-wheeled motor vehicle according to any one of claims 1, 2, 4 and 6, wherein
a stay (116) having an attachment portion (116a) is fixed to a frame member (29) disposed on a lateral side of the housing box (38) and forming part of a vehicle-body frame (F), the attachment portion (116a) extending inward from the frame member (29), and
the power-receiving-side connector (67) is attached to the attachment portion (116a).

11. The electric two-wheeled motor vehicle according to any one of claims 1, 2, 3, 4 and 6, further comprising a side stand (31) for maintaining a standing state in which a vehicle body (B) is inclined to one side in a vehicle width direction, wherein
the power-receiving-side connector (67) and the opening (118) are disposed on a lateral side of the housing box (38) on a side in the vehicle width direction where the side stand (31) is disposed.

12. The electric two-wheeled motor vehicle according to any one of claims 1, 2, 3, 4 and 6, wherein the power-receiving-side connector (67) to which the power-supplying-side connector (66) leading to the external power source (PS) via a charger (65) is connectable is connected to the battery (36) via a DC-DC converter (68) disposed rearward of the housing box (38).

13. The electric two-wheeled motor vehicle according to any one of claims 1, 2 and 3, wherein
the lid member (146) capable of covering the opening (145) is turnably supported by the side cover (48) via a hinge mechanism (147), and
a closed state maintaining mechanism (151) is provided between the lid member (146) and the side cover (48), the closed state maintaining mechanism (151) switching between a lock state where the lid member (146) is maintained at a closed position in a non-operation state of an operator (152) disposed to face a surface of the side cover (48) at a position near the opening (145) and an unlock state where an opening operation of the lid member (146) is allowed in accordance with an operation of the operator (152).

14. The electric two-wheeled motor vehicle according to claim 4, wherein
the lid member (146) is formed to have a substantially triangular shape having three vertex portions (P1, P2, P3),
the closed state maintaining mechanism (151) is provided between the lid member (146) and the side cover (48), in a certain vertex portion (P3) among the vertex portions (P1 to P3), and
the lid member (146) is turnably supported by the side cover (48) via the hinge mechanism (147) on a side portion of the side cover (48) on the opposite side to the certain vertex portion (P3).

15. The electric two-wheeled motor vehicle according to claim 14, wherein the lid member (146) is turnably supported by the side cover (48) such that the lid member (146) is in a posture with one vertex portion (P1) among the vertex portions (P1 to P3) being directed downward in a state where the opening (145) is closed.

16. The electric two-wheeled motor vehicle according to any one of claims 4, 14 and 15, wherein a conductive wire (122) leading to the power-supplying-side connector (66) is interposed between the lid member (146) in a closed state and the side cover (48) with an elastic member (167) interposed between the conductive wire (122) and at least one of the lid member (146) and the side cover (48).

17. The electric two-wheeled motor vehicle according to any one of claims 4, 14 and 15, further comprising restriction means (160) for restricting a switching work of the operator (152) of switching the closed state maintaining mechanism (151) from the lock state to the unlock state.

18. The electric two-wheeled motor vehicle according to claim 17, wherein
the restriction means (160) includes a switch operator (161) used for switching between a restricted state where the switching of the closed state maintaining mechanism (151) from the lock state to the unlock state is restricted and a non-restricted state where the switching of the closed state maintaining mechanism (151) from the lock state to the unlock state is allowed, and
the switch operator (161) is disposed in the housing box (38) to be capable of being operated in the housing box (38).

19. The electric two-wheeled motor vehicle according to claim 18, wherein a portion of the restriction means (160) other than the switch operator (161) is disposed between the housing box (38) and the side cover (48).

20. The electric two-wheeled motor vehicle according to claim 18, wherein the restriction means (160) is configured to mechanically work in accordance with a work of the switch operator (161) being a control knob capable of a turn operation.

21. The electric two-wheeled motor vehicle according to any one of claims 4, 14 and 15, wherein a design mark (150) showing that the power-receiving-side connector (67) is disposed inside the lid member (146) is provided on an external design surface of the lid member (146).

* * * * *

UNITED STATES PATENT AND TRADEMARK OFFICE
CERTIFICATE OF CORRECTION

PATENT NO. : 8,662,232 B2  
APPLICATION NO. : 13/496132  
DATED : March 4, 2014  
INVENTOR(S) : Masanori Nakamura et al.

Page 1 of 1

It is certified that error appears in the above-identified patent and that said Letters Patent is hereby corrected as shown below:

On the title page

Item (73) Assignee:

Please change "Honda Motors Co., Ltd." to

--Honda Motor Co., Ltd.--

Signed and Sealed this  
Fourteenth Day of June, 2016

Michelle K. Lee  
*Director of the United States Patent and Trademark Office*